US 6,611,560 B1

(12) United States Patent
Kresch et al.

(10) Patent No.: US 6,611,560 B1
(45) Date of Patent: Aug. 26, 2003

(54) METHOD AND APPARATUS FOR PERFORMING MOTION ESTIMATION IN THE DCT DOMAIN

(75) Inventors: Renato Kresch, Haifa (IL); Neri Merhav, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/488,343

(22) Filed: Jan. 20, 2000

(51) Int. Cl.[7] .......................... H04N 7/12; H04N 11/02; H04N 11/04
(52) U.S. Cl. .............. 375/240.16; 375/240.2; 375/240.24
(58) Field of Search .................. 375/240.16, 240.24, 375/240.21

(56) References Cited

U.S. PATENT DOCUMENTS 5,790,686 A * 8/1998 Koc et al. .................. 382/107
5,937,101 A * 8/1999 Jeon et al. .................. 382/268

OTHER PUBLICATIONS

Stephen A Martucci, Symmetric Convolution and the Discrete Sine and Cosine Transforms 1994, IEEE, All.*

* cited by examiner

Primary Examiner—Chris Kelley
Assistant Examiner—Charles Parsons

(57) ABSTRACT

A motion vector between a current block and a reference block of a reference frame is determined by calculating the exact linear cross-correlation between the current block and the potential reference blocks of the reference picture. The current block is orthogonally transformed using DCT/DST transforms of a first type without prior zero padding of the current block to generate a current quadruple of transform coefficient blocks. The current quadruple is processed together with a reference quadruple of transform coefficient blocks generated from four of the search region blocks to generate a quadruple of processed transform coefficient blocks. The quadruple of processed transform coefficient blocks is inversely transformed using inverse DCT/DST transforms of a second type to generate a block of exact cross-correlations between the current block and the search region. The motion vector is determined from the block of exact cross-correlations.

20 Claims, 13 Drawing Sheets

METHOD AND APPARATUS FOR PERFORMING MOTION ESTIMATION IN THE DCT DOMAIN

FIELD OF THE INVENTION

The invention relates to video signal compression and, in particular, to a method and apparatus that perform motion estimation in the DCT domain in the course of compressing a video signal.

BACKGROUND OF THE INVENTION

Generally, a motion picture signal has a high correlation between portions of the motion picture signal representing two consecutive pictures, except when scene changes occur. Thus a motion picture signal can be compressed by determining the differences in the pixel data between consecutive pictures of the motion picture signal, and then encoding these differences. However, if the picture represented by the motion picture signal includes moving portions, the number of difference data can be large. For this reason, block motion estimation is preferably used.

In block motion estimation, the current picture is divided into blocks and the location in another picture, called a reference picture, of a reference block that most closely matches the current block is determined. The differences between the current block and the reference block are then calculated and encoded. The close match between the current block and the reference block ensures that the encoding process generates only a small number of data. The spatial displacement in the reference picture between the reference block and a block corresponding in location to the current block in the current picture is represented by a motion vector. The motion vectors determined for the blocks of the current picture may also be subject to encoding.

Block motion estimation is often the most computationally demanding processing performed in standard motion picture signal compression schemes, such as MPEG and H.263. See, for example, D. le Gall, MPEG—Video Compression Standard for Multimedia Applications, 34 COMMUNICATIONS OF THE ACM, 47–58, (1991 April). Block motion estimation may involve a search for the best of the potential reference blocks located in a certain search range of the reference picture as the reference block. The reference block is the best of the potential reference blocks in the sense that a given distance measure between it and the current block has a minimum value. However, in many applications, the computational complexity of the just-described full search method is too high.

One alternative is to perform a suboptimal search, which may be performed by conducting a partial search in which only a subset of the potential reference blocks is tested, or may be performed iteratively searching at finer resolutions. These approaches significantly reduce the computational burden of motion estimation at the expense of increasing the motion estimation error, and thus increasing the number of data generated when the differences between the current block and the reference block are encoded.

Another alternative with a lower computational burden is to perform a full search in the frequency domain. In this case, the spatial domain cross-correlation function between the current block and the potential reference blocks is calculated in the frequency domain using element-by-element multiplication. The current block and the potential reference blocks may be transformed to the frequency domain using a discrete Fourier transform (DFT), and, in particular, by using the fast Fourier transform (FFT) algorithm. Using a DFT works best for large blocks, which make the DFT complexity small compared to the overall complexity. However, for blocks of the size used in MPEG coders, the complexity of the transformation processing is relatively high, which makes this approach unattractive. Two factors contribute to the high complexity of the DFT in this application: (i) The spatial domain blocks have to be padded with zeroes to turn the cyclic correlation induced by the DFT into linear correlation, and (ii) the DFT generates complex numbers, even though the input blocks and the final outputs are all real numbers.

Two other transform domain methods have recently been suggested. In Frequency-Domain Motion Estimation Using a Complex Lapped Transform, 2 IEEE TRANS. ON IMAGE PROCESSING, 2–17, (1993 January), R. W. Young and N. G. Kingsbury proposed using the complex lapped transform (CLT), which is a Fourier-based overlapping transform that relaxes the need for zero padding. This method has reduced complexity compared to the full search in the spatial domain and the DFT-based frequency domain scheme. However, the CLT motion estimation algorithm does not calculate the exact cross-correlation between the blocks, but rather an approximation to a smooth (filtered) cross-correlation version of it. Young and Kingsbury claim that smoothing decreases the effect of noise on the motion estimation. However, Koc and Liu have pointed out that smoothing also makes the estimation less accurate for blocks containing blur edges.

The second transform-domain motion estimation algorithm is that proposed by U. V. Koc and K. J. R. Liu in DCT-Based Motion Estimation, ISR TR 95-1, University of Maryland; Discrete-Cosine /Sine-Transform Based Motion Estimation, PROC. IEEE INT'L CONF. ON IMAGE PROCESSING (ICIP), III-771–775, (1994 November); Low-Complexity Motion Estimation Scheme Utilizing Sinusoidal Orthogonal Principle, PROC. IEEE WORKSHOP ON VISUAL SIGNAL PROCESSING AND COMMUNICATIONS, 57–62, (1994 September); and Adaptive Overlapping Approach for DCT-Based Motion Estimation, PROC. IEEE INT'L CONF. ON IMAGE PROCESSING (ICIP), (1995 October). Koc and Liu's algorithm, called DXT, is based on the concept of so-called DCT/DST Pseudo-Phase. The phase-correlation method for motion estimation is translated from the DFT domain to the discrete cosine transform (DCT) and discrete sine transform (DST) domains. Since the DCT and DST are real, they contain no phase component. However, by combining the information encapsulated in both transforms, DXT produces pseudo-phase terms, with properties similar to those of the Fourier phase components. Even though DXT is elegant, and may be useful for large transform coefficient blocks, edge effects prevent DXT from producing accurate results for transform coefficient blocks of the size commonly used in MPEG coders.

Accordingly, what is needed is a frequency-domain motion estimation scheme that calculates the exact linear cross-correlation between the current block and the potential reference blocks of the reference picture, that does not require zero padding to be applied to the input blocks before transformation, that does not involve manipulating complex numbers, and that operates fast enough to be used for real-time motion estimation.

SUMMARY OF THE INVENTION

The invention provides a method for determining a motion vector between a current block and a reference block of a reference frame. The reference block is a block located in a search region of the reference picture that most closely matches the current block. The search region is divided into search region blocks. In the method, the current block is orthogonally transformed using DCT/DST transforms of a first type without prior zero padding of the current block to generate a current quadruple of transform coefficient blocks. The current quadruple is processed together with a reference quadruple of transform coefficient blocks generated from four of the search region blocks to generate a quadruple of processed transform coefficient blocks. The quadruple of processed transform coefficient blocks is inversely transformed using inverse DCT/DST transforms of a second type to generate a block of exact cross-correlations between the current block and the search region. The motion vector is determined from the block of exact cross-correlations.

The invention also provides an apparatus for determining a motion vector between a current block and a reference block of a reference frame. The apparatus comprises an orthogonal transform module, a processing module, an inverse transform module and a motion vector determining module. The orthogonal transform module is connected to receive the current block and operates to generate a current quadruple of transform coefficient blocks by orthogonally transforming the current block using DCT/DST transforms of a first type without prior zero padding of the current block. The processing module is connected to receive the current quadruple from the orthogonal transform module, and additionally to receive a reference quadruple of transform coefficient blocks generated from four of the search region blocks. The processing module operates to generate a quadruple of processed transform coefficient blocks from the current quadruple and the reference quadruple. The inverse transform module is connected to receive the quadruple of processed transform coefficient blocks from the processing module, and operates to generate a block of exact cross-correlations between the current block and the search region by inversely transforming the quadruple of processed transform coefficient blocks using inverse DCT/DST transforms of a second type. The motion vector determining module is connected to receive the block of exact cross-correlations and operates to determine the motion vector therefrom.

The inverse DCTs and DSTs of the second type may be of a type different from the DCTs and DSTs of the first type. In a preferred embodiment, the forward transforms are of Type IIe and the inverse transforms are of Type Ie according to Wang's classifications set forth by S. A. Martucci, in *Symmetric Convolution and Discrete Sine and Cosine Transforms*, SP-41 *IEEE Trans. on Signal Processing*, 1038–1051, (1994 May) and K. R. Rao, and P. Yip, DISCRETE COSINE TRANSFORM: ALGORITHMS, ADVANTAGES, APPLICATIONS, Academic Press (1990).

The motion estimation apparatus and method according to the invention calculate the exact cross-correlation between the current block and potential reference blocks in the reference picture using only forward and inverse DCTs and DSTs, thus avoiding the need to perform complex-number arithmetic operations. Moreover, the motion estimation apparatus and method according to the invention do not apply zero padding to the input blocks or the blocks into which the search region is divided before these blocks are subject to forward DCT and DST processing. Thus, the forward DCT and DST processing performed in the motion estimation apparatus and method according to the invention is of minimal complexity.

Since the DCT/DST-based motion estimation method and apparatus according to the invention calculate the exact linear cross-correlation, they do not suffer from edge effects, and produce results that are identical to those obtained by a full search in the spatial domain using the mean squared error (MSE) criterion.

When four frame stores are provided to store the quadruples of transform coefficients generated from the reference picture, the number of computational operations required by the DCT/DST-based motion estimation method and apparatus according to the invention is about 9% of that required by a full search using the MSE criterion, and 24% of that required by a full search using the mean absolute difference (MAD) criterion. When such a buffer is not provided, the above numbers of computational operations change to 10–64% (MSE) and 26–64% (MAD).

Tests show that the DCT/DST-based motion estimation method and apparatus according to the invention operate significantly faster than the above-described transform domain methods for practically the same memory requirements and provide substantially higher accuracy.

DETAILED DESCRIPTION OF THE INVENTION

Figure 1A:
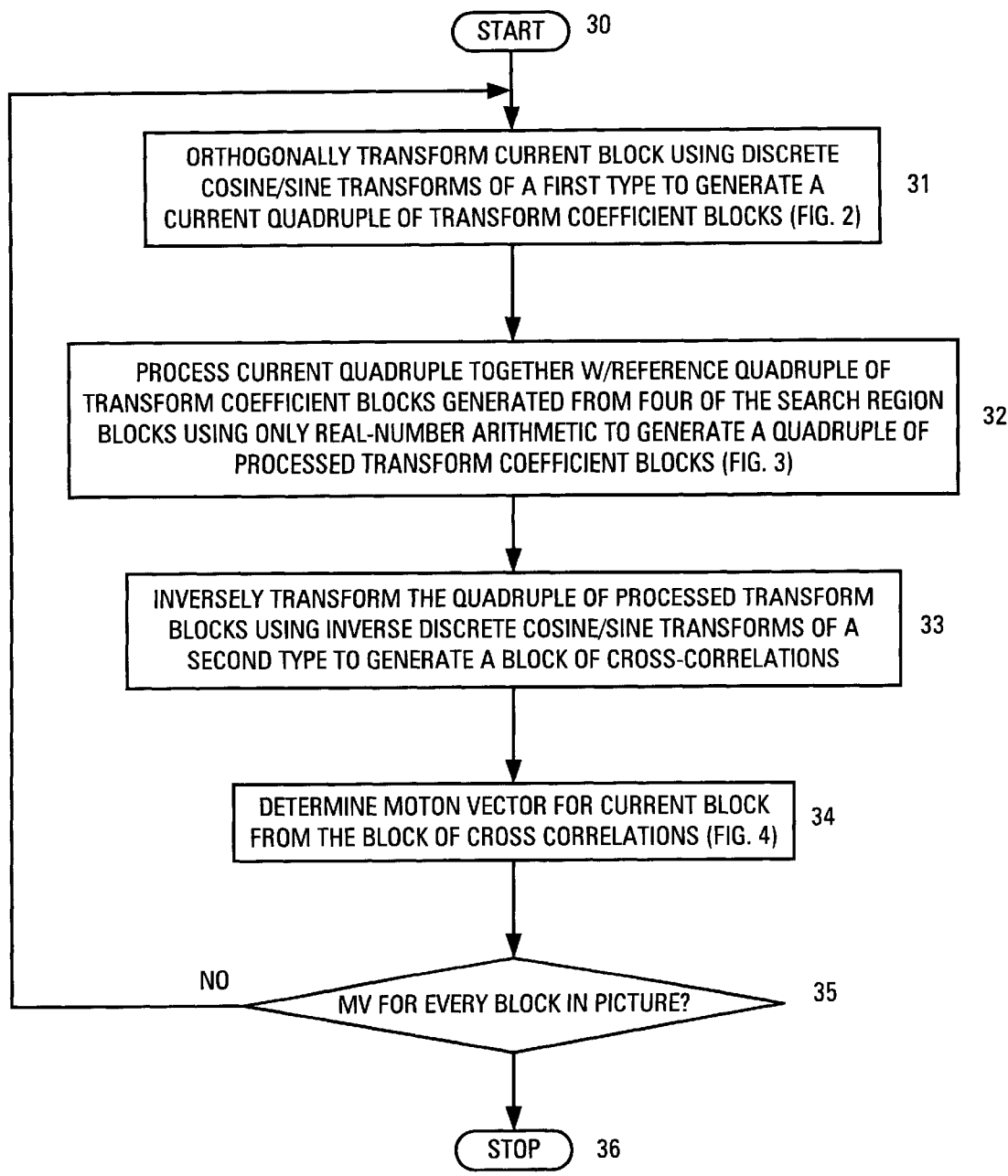
FIG. 1A is a flow chart showing an embodiment of a motion estimation method according to the invention.

FIG. 1A shows an embodiment of a motion estimation method according to the invention. The motion estimation method determines a motion vector for a current block, which is one of an array of non-overlapping two-dimensional blocks of M×M pixels into which the current picture (not shown) is divided. The motion vector represents the distance and direction between the current block and a reference block, which is a two-dimensional block of M×M pixels located in a reference picture (not shown) that most closely matches the current block. The reference picture may precede or follow the current picture in presentation order, but precedes the current picture in coding order.

To constrain the search for the reference block, a search range is defined in the reference picture. The search range is a two-dimensional region conventionally centered on the point in the reference picture corresponding to the origin of the current block in the current picture. There are P×P blocks of M×M pixels with origins in a search range of P×P pixels. Such blocks will be called potential reference blocks. One of the potential reference blocks is the reference block for the current block. The potential reference blocks collectively occupy a region of the reference picture called the search region. The search region is a region of the reference picture equal in size, horizontally and vertically, to the sum of the search range and the current block. The search region is divided into a number of two-dimensional search region blocks.

Figure 1B:
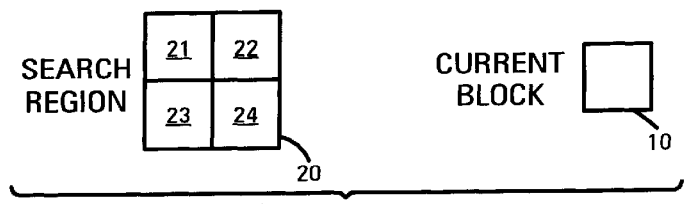
FIG. 1B shows an example of the current block and the search region.

FIG. 1B shows an example of the current block 10 and the search region 20. In the example shown, the search region blocks and the search range are both equal in size to the current block. Consequently, the search region is twice the size, horizontally and vertically, of the current block, and is divided into the four search region blocks 21, 22, 23 and 24. The search range extends from $-M/2$ pixels to $+(M/2-1)$ pixels horizontally and vertically relative to the point in the reference picture corresponding to the origin of the current block.

The method according to the invention determines the motion vector for the current block by calculating a block of cross-correlations between the current block and a search region of the reference picture. Each cross-correlation in the block represents the cross-correlation between the current block and one of the potential reference blocks. The method will be described with reference to FIGS. 1A and 1B.

Processing starts at process 30. In process 31, the current block is orthogonally transformed using two-dimensional discrete cosine/sine transforms of a first type to generate a quadruple of transform coefficient blocks. No zero padding is applied to the current block before it is orthogonally transformed. In this embodiment of the motion estimation method according to the invention, the discrete cosine/sine transforms of the first type are Type IIe forward discrete cosine/sine transforms according to Wang's classification of discrete trigonometric transforms described by S. A. Martucci in *Symmetric Convolution and Discrete Sine and Cosine Transforms*, SP-42 *IEEE Trans. on Signal Processing*, 1038–1051 (1994 May). Process 31 will be described in more detail below with reference to FIG. 2.

In this disclosure, the term quadruple of transform coefficient blocks will be used to refer to a set of four, two-dimensional blocks of transform coefficients obtained by applying a discrete cosine transform (DCT), a discrete sine transform (DST), a mixed cosine-sine transform (CST) and a mixed sine-cosine transform (SCT) of the same type to a single block of pixel values, such as the current block 10, or any one of the search region blocks 21–24. Thus, a quadruple of transform coefficient blocks is composed of one two-dimensional block of DCT coefficients, one two-dimensional block of DST coefficients, one two-dimensional block of CST coefficients and one two-dimensional block of SCT coefficients. Since they have been generated using only discrete cosine and sine transforms, all the transform coefficients in a quadruple of transform coefficient blocks consist exclusively of real numbers.

In process 32, the quadruple of transform coefficient blocks generated from the current block, which will be called the current quadruple, is processed together with a reference quadruple using only real-number arithmetic operations to generate a quadruple of processed transform coefficient blocks. The reference quadruple is a quadruple of transform coefficient blocks generated from the four of the search region blocks. In the arrangement of search region blocks shown in FIG. 1B, the reference quadruple is generated from the four search region blocks 21–24. When the search region is composed of more than four search region blocks, as will be described in detail below with reference to FIG. 11B, the reference quadruple is generated from a set of four of the search region blocks.

The reference quadruple may be generated from the search region blocks 21–24 by orthogonally transforming the search region blocks 21–24 using the same type of discrete cosine/sine transforms as is used to transform the current block to generate a quadruple of transform coefficient blocks from each of the search region blocks and then performing a folding operation, to be described below with reference to FIG. 5, to generate the single reference quadruple from the four quadruples of transform coefficient blocks respectively generated from the four search region blocks. No zero padding is applied to the search region blocks before they are orthogonally transformed. Instead of orthogonally transforming the search region blocks in a separate operation, the quadruples of transform coefficient blocks generated from the search region blocks may be obtained by storing the quadruples of transform coefficient blocks generated when process 31 was performed on the reference picture. Four quadruples of transform coefficient blocks are then read from the store and the above-mentioned folding operation is performed to generate from them the reference quadruple for the current block. This process will be described in more detail with reference to FIG. 10B. Process 32 will be described in more detail below with reference to FIG. 3.

In process 33, the quadruple of processed transform coefficient blocks is inversely transformed using respective inverse discrete cosine/sine transforms of a second type to generate a block of exact cross-correlations between the current block and each potential reference block in the search region. In this embodiment, the inverse discrete cosine/sine transforms of the second type are Type Ie inverse discrete cosine/sine transforms according to Wang's above-mentioned classification of discrete trigonometric transforms.

In process 34, the motion vector for the current block is determined from the block of exact cross-correlations. Process 34 will be described in more detail below with reference to FIG. 4.

In process 35, a test is performed to determine whether a motion vector has been determined for all the blocks of the current picture. When the test result is NO, processing returns to operation 31 so that the motion vector for another block of the current picture can be determined. When the test result is YES, processing advances to process 36, where it stops.

The motion vector estimation method according to the invention will now be described in more detail with reference to FIGS. 2, 3 and 4.

Figure 2:
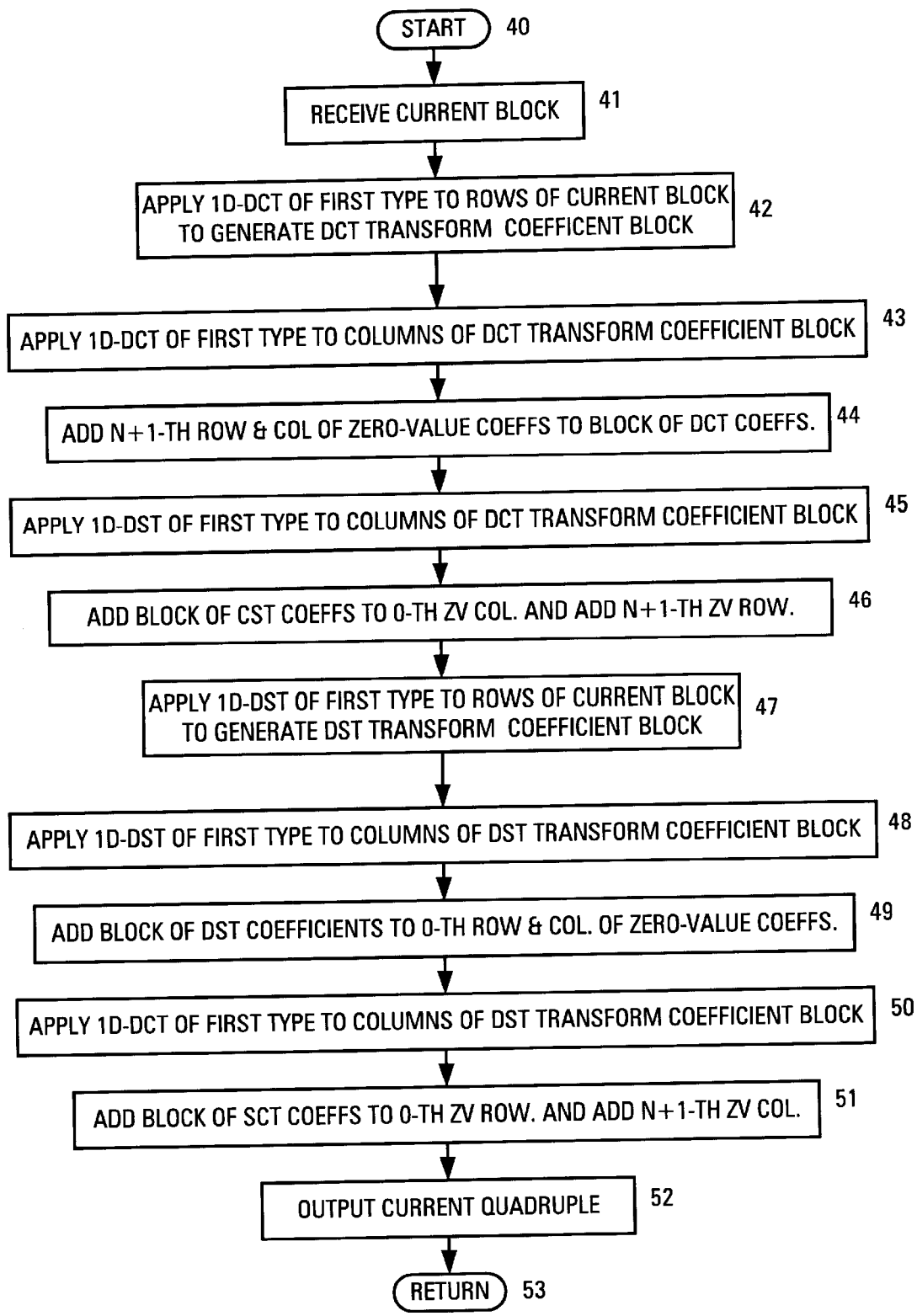
FIG. 2 shows details of the subroutine performed in the forward transform processing operation shown in FIG. 1A.

FIG. 2 shows details of the subroutine performed in the forward transform processing 31 shown in FIG. 1A. The subroutine starts at process 40. In process 41, the current block is received. In process 42, a one-dimensional discrete cosine transform (1D-DCT) of the first type is applied to the rows of the current block to generate a DCT transform coefficient block. In process 43, a 1D-DCT of the first type is applied to the columns of the DCT transform coefficient block to generate a two-dimensional block of N×N DCT coefficients. The order of processes 42 and 43 may be reversed. Note that no zero padding is applied to the current block before it is processed. In process 44, an N+1-th row and an N+1-th column of zero-valued coefficients is added to the block of N×N DCT coefficients to generate a block of (N+1)×(N+1) DCT coefficients. In this embodiment, N is equal to M, the size, horizontally and vertically, of the current block 10 and is also the size of the search region blocks 21–24.

In process 45, a one-dimensional discrete sine transform (1D-DST) of the first type is applied to the columns of the transform coefficient block generated by process 42 to generate a two-dimensional block of N×N CST coefficients. In process 46, the block of N×N CST coefficients is added to a 0-th column of zero-value coefficients and an (N+1)-th row of zero-valued coefficients is added to generate a block of (N+1)×(N+1) CST coefficients. A row of zero-value coefficients and a column of zero-valued coefficients are indicated by the abbreviations ZV ROW and ZV COL., respectively, in FIG. 2.

In process 47, a 1D-DST of the first type is applied to the rows of the current block to generate a DST transform coefficient block. In process 48, a 1D-DST of the first type is applied to the columns of the DST transform coefficient block to generate a two-dimensional block of N×N DST coefficients. In process 49, the block of N×N DST coefficients is added to a 0-th row and a 0-th column of column of zero-valued coefficients to generate a block of (N+1)× (N+1) DST coefficients.

In process 50, a 1D-DCT of the first type is applied to the columns of the DST transform coefficient block generated by process 47 to generate a two-dimensional block of N×N SCT coefficients. In process 51, the block of N×N SCT coefficients is added to a 0-th row of zero-value coefficients and an N+1-th column of zero-valued coefficients is added to generate a block of (N+1)×(N+1) SCT coefficients.

In process 52, the current quadruple is output. The current quadruple is a quadruple of transform coefficient blocks composed of the block of DCT coefficients generated by process 44, the block of DST coefficients generated by process 49, the block of CST coefficients generated by process 46 and the block of SCT coefficients generated by process 51. Each of the transform coefficient blocks in the current quadruple is a two-dimensional array of (N+1)×(N+1) transform coefficients in which one row and one column is composed of zero-value coefficients.

Processing then advances to process 52, whence the subroutine returns to the main routine.

In embodiments in which the process of generating the reference quadruple involves orthogonally transforming each of four search region blocks using discrete cosine/sine transforms of the first type, each search region block may be processed using the subroutine shown in FIG. 2 to generate a respective quadruple of transform coefficient blocks. The folding operation to be described below with reference to FIG. 5 is then applied to the quadruples of transform coefficient blocks generated from the four of the search region blocks to generate the reference quadruple.

Figure 3:
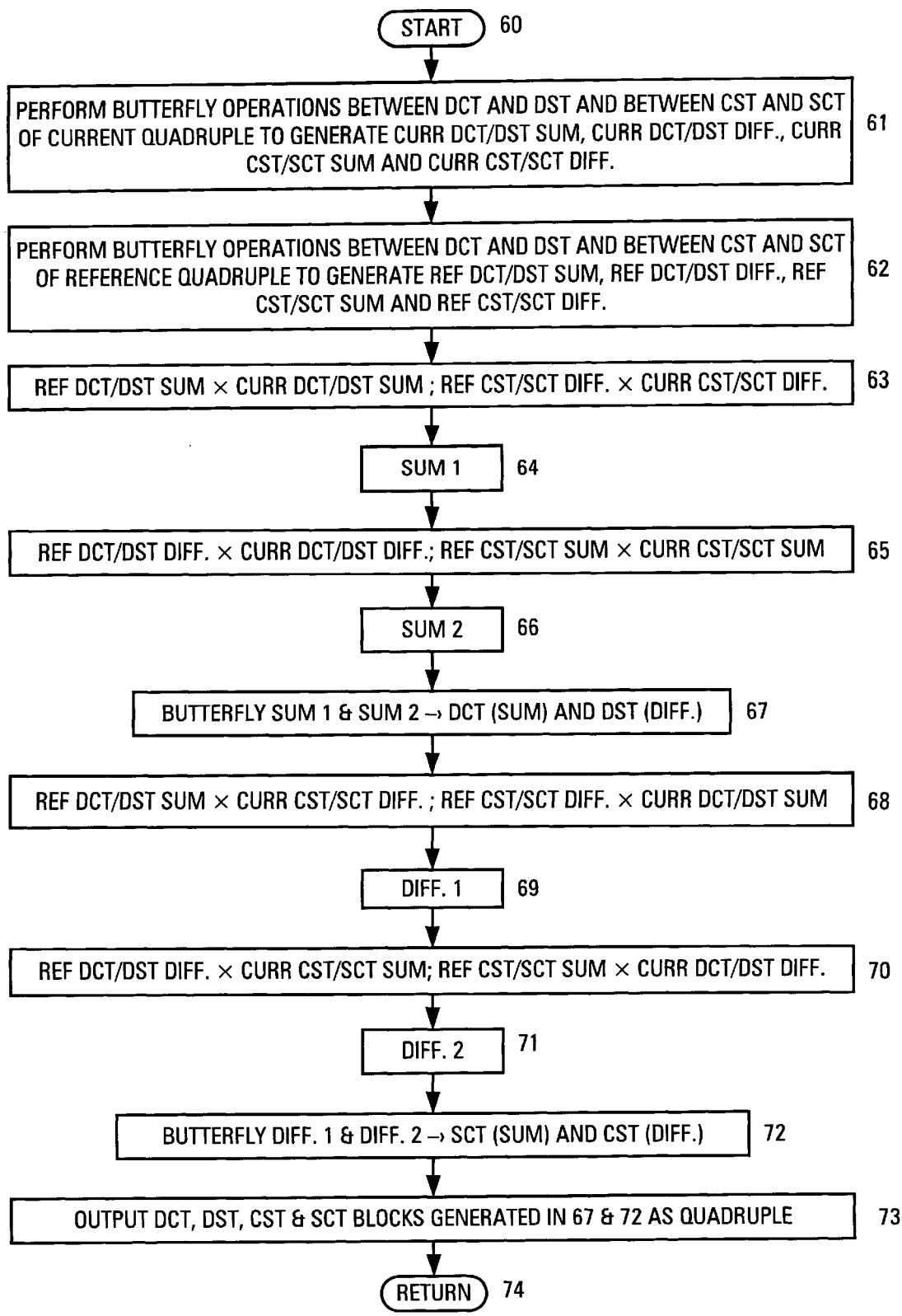
FIG. 3 shows details of the subroutine performed to effect the real-number arithmetic processing shown in FIG. 1A.

FIG. 3 shows details of the subroutine performed to effect the real-number arithmetic processing of process 32 shown in FIG. 1A. Processing starts at process 60. In process 61, butterfly operations are performed between the DCT block and the DST block and between the CST block and the SCT block of the current quadruple. The butterfly operations generate a current DCT/DST sum, a current DCT/DST difference, a current CST/SCT sum and a current CST/SCT difference.

In process 62, butterfly operations are performed between the DCT block and the DST block and between the CST block and the SCT block of the reference quadruple. The butterfly operations generate a reference DCT/DST sum, a reference DCT/DST difference, a reference CST/SCT sum and a reference CST/SCT difference.

In process 63, the reference DCT/DST sum is multiplied by the current DCT/DST sum, and the reference CST/SCT difference is multiplied by the current CST/SCT difference. In process 64, the products generated in process 63 are summed to generate a first block of summed transform coefficients.

In process 65, the reference DCT/DST difference is multiplied by the current DCT/DST difference, and the reference CST/SCT sum is multiplied by the current CST/SCT sum. In process 66, the products generated in process 65 are summed to generate a second block of summed transform coefficients.

In process 67, a butterfly operation is performed between the blocks of summed transform coefficients generated in processes 66 and 64. The butterfly operation generates a sum that is a block of DCT coefficients, and a difference that is a block of DST coefficients.

In process 68, the reference DCT/DST sum is multiplied by the current CST/SCT difference to generate a first block of multiplied transform coefficients and the reference CST/SCT difference is multiplied by the current DCT/DST sum to generate a second block of multiplied transform coefficients. In process 69, the second block of multiplied transform coefficients is subtracted from the first block of multiplied transform coefficients to generate a first block of subtrated transform coefficients.

In process 70, the reference DCT/DST difference is multiplied by the current CST/SCT sum to generate a third block of multiplied transform coefficients and the reference CST/SCT sum is multiplied by the current DCT/DST difference to generate a fourth block of multiplied transform coefficients. In process 71, the fourth block of multiplied transform coefficients is subtracted from the third block of multiplied transform coefficients to generate a second block of subtracted transform coefficients.

In process 72, a butterfly operation is performed between the blocks of subtracted transform coefficients calculated in processes 71 and 69. The butterfly operation generates a sum that is a block of SCT coefficients and a difference that is a block of CST coefficients.

In process 73, the blocks of DCT and DST coefficients generated by the butterfly operation performed in process 67 and the blocks of CST and SCT coefficients generated by the butterfly operation performed in process 72 are collectively output as the quadruple of processed transform coefficient blocks.

Processing then advances to process 74, whence it returns to the main routine.

In process 33 shown in FIG. 1A, in which the quadruple of processed transform blocks is inversely transformed using inverse discrete cosine/sine transforms of the second type, one-dimensional inverse discrete sine or cosine transforms, as appropriate, are applied to the columns of the processed transform blocks constituting the quadruple to generate respective partially inversely-transformed blocks. The inverse transforms are then completed by applying one-dimensional inverse discrete sine or cosine transforms, as appropriate, to the rows of the partially inversely-transformed blocks. Alternatively, the rows may be inversely transformed before the columns.

The three blocks of cross-correlation components obtained by inversely transforming the blocks of processed DCT, DST and CST coefficients are then subtracted from the block of cross-correlation components obtained by inversely transforming the block of processed SCT coefficients to generate the block of cross-correlations. This processing will be described in greater detail below with reference to FIG. 9A–9E.

The block of cross-correlations is composed of a cross-correlation for each potential reference block in the search range. In the example shown in FIG. 1B, in which the size of the search range, horizontally and vertically, is equal to that of the current block, the potential reference blocks are blocks equal in size to the current block with origins extending from –M/2 pixels to +(M/2–1) pixels horizontally and vertically relative to the point in the reference picture corresponding to the origin of the current block. Thus, since there are M×M potential reference blocks in such a search region, the size of the block of cross-correlations is equal to that of the current block.

When the size of the search range, horizontally and vertically, is twice that of the current block, and the size of the search region, horizontally and vertically, is therefore three times that of the current block, as in a typical MPEG coder, there are 2M×2M potential reference blocks in the search region and the size of the block of cross-correlations is twice that of the current block, horizontally and vertically. To generate a block of cross-correlations of this size, processes 31–33 are run four times: each time the processes are run generating one quadrant of the block of cross-correlations. Process 34 is then performed on the block of 2M×2M cross-correlations in the block of cross-correlations and the 2M×2M potential reference blocks.

Figure 4:
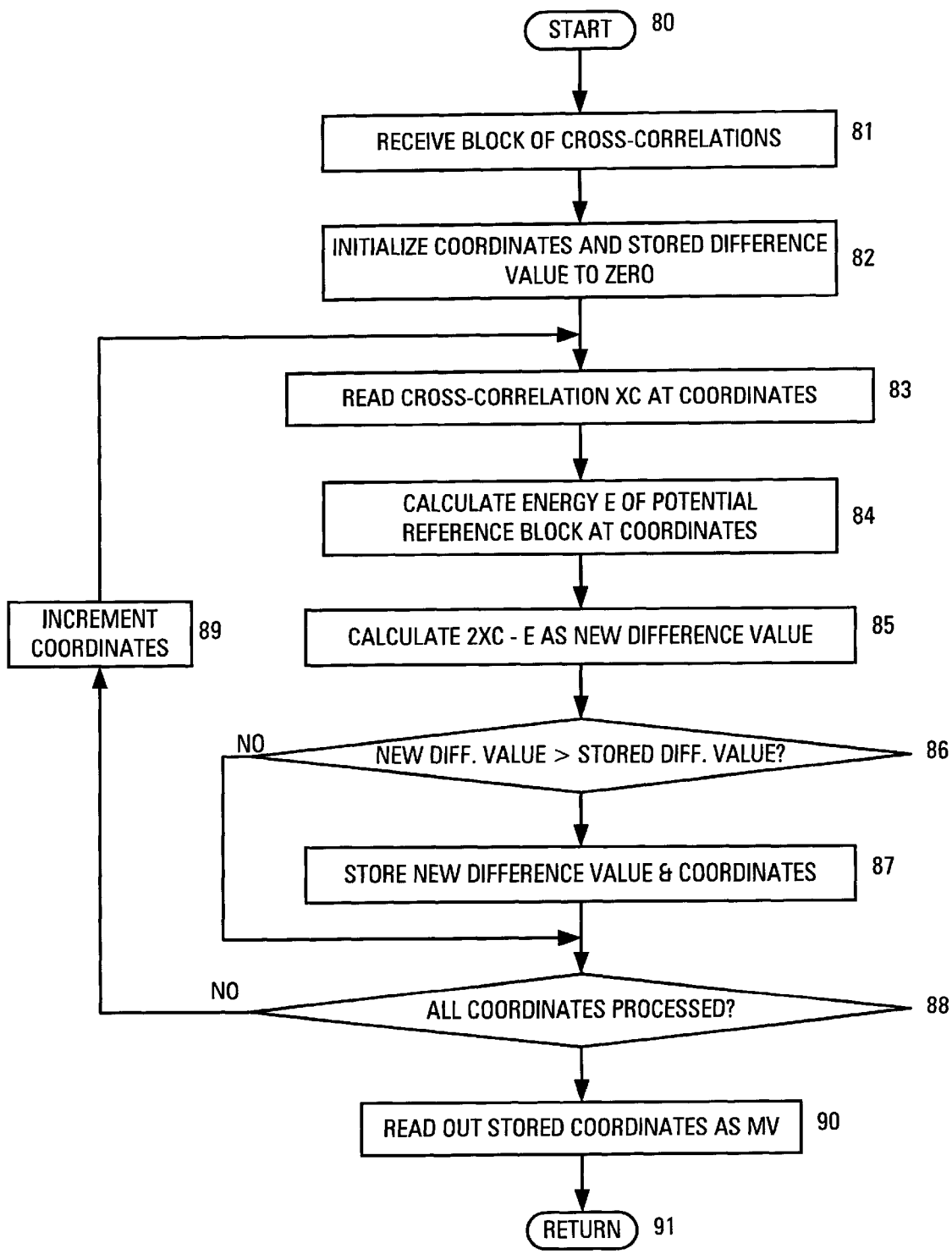
FIG. 4 shows details of the subroutine performed to determine the motion vector from the block of cross-correlations.

FIG. 4 shows details of the subroutine performed in process 34 shown in FIG. 1A to determine the motion vector from the block of cross-correlations generated in process 33. Processing starts at process 80. In process 81, the block of cross-correlations is received. The block of cross-correlations is composed of one cross-correlation for each potential reference block in the search region 20. Each potential reference block is identified by its coordinates in the search range. In the embodiment described, coordinates of the potential reference block in the search range and the coordinates of its cross-correlation in the block of cross-correlation values correspond. However, this is not critical to the invention: each potential reference block and its cross-correlation may be linked in other ways.

In process 82, the coordinates for the search range, the coordinates for the block of cross-correlations, and a stored difference value are initialized to zero.

In process 83, the cross-correlation stored at the coordinates is read.

In process 84, the energy of the potential reference block identified by the coordinates is calculated. This may be done by recursion, for example.

In process 85, the cross-correlation is doubled and the energy calculated in process 84 is subtracted from the doubled cross-correlation to generate a new difference value.

In process 86, a test is performed to determine whether the new difference value calculated in process 85 is greater than the stored difference value. When the test result is YES, processing advances to process 87, where the new difference value and the coordinates are stored in lieu of the existing stored difference value and coordinates. Processing then advances to process 88. When the test result is NO, processing advances directly to process 88.

In process 88, a test is performed to determine whether the cross-correlations at all the coordinates in the block of cross-correlations have been processed. When the test result is NO, execution returns to process 83 via process 89, where the coordinates are incremented, so that the cross-correlation at another coordinates in the block of cross-correlations can be processed. When the test result is YES, indicating that the cross-correlations at all the coordinates in the block of cross-correlations have been processed, and that the stored difference value is therefore a maximum difference value, processing advances to process 90.

In process 90, the stored coordinates, which are the coordinates corresponding to the maximum difference value, are read out as the motion vector for the current block.

Process 91 returns execution to the main routine.

Figure 5:
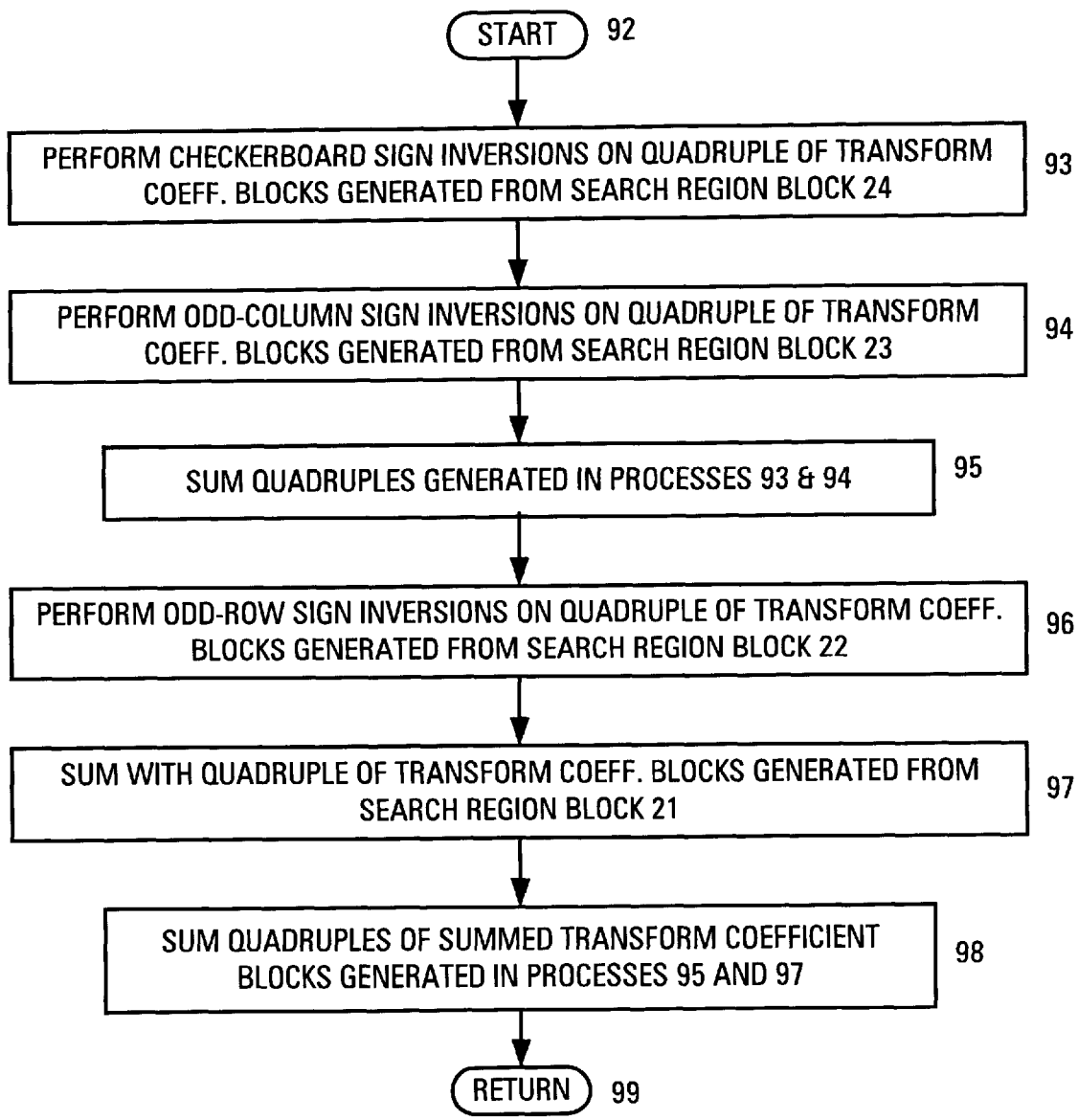
FIG. 5 shows details of the folding operation that may be performed to merge the four quadruples of transform coefficient blocks generated from four of the search region blocks to generate the reference quadruple required by the real-number arithmetic processing shown in FIG. 1A.

FIG. 5 shows details of the folding operation that may be performed to merge the four quadruples of transform coefficient blocks generated from four of the search region blocks to generate the reference quadruple required by the real-number arithmetic processing 32 shown in FIG. 1A. The four quadruples of transform coefficient blocks may be generated by orthogonally transforming anew the search region blocks corresponding to the current block, or may be the stored results obtained when blocks of the reference picture were earlier orthogonally transformed. The operation starts in step 92.

In process 93, a checkerboard sign inversion is performed on the blocks of transform coefficients constituting the quadruple of transform coefficient blocks generated from the search region block 24 (FIG. 1B). In the checkerboard sign inversion, the sign is inverted of those transform coefficients located in odd-numbered columns or odd-numbered rows, but not of those located in columns and rows that are both odd-numbered.

In process 94, an odd-column sign reversal is performed on the blocks of transform coefficients constituting the quadruple of transform coefficient blocks generated from the search region block 23 (FIG. 1B). In the odd-column sign inversion, the sign is inverted of those transform coefficients located in odd-numbered columns of the transform coefficient blocks.

In process 95, the quadruples of partially-sign inverted transform coefficient blocks generated in processes 93 and 94 are respectively summed to generate a first quadruple of summed transform coefficient blocks.

In process 96, an odd-row sign reversal is performed on the blocks of transform coefficients constituting the quadruple of transform coefficient blocks generated from the search region block 22 (FIG. 1B). In the odd-row sign inversion, the sign is inverted of those transform coefficients located in odd-numbered rows of the transform coefficient blocks.

In process 97, the quadruple of partially-sign inverted transform coefficient blocks generated in process 96 and the quadruple of transform coefficient blocks generated from the search region block 21 are respectively summed to generate a second quadruple of summed transform coefficient blocks.

In process 98, the first and second quadruples of summed transform coefficient blocks generated in processes 95 and 97 are summed to generate the reference quadruple.

In process 99, the operation returns to the main routine.

Figure 6:
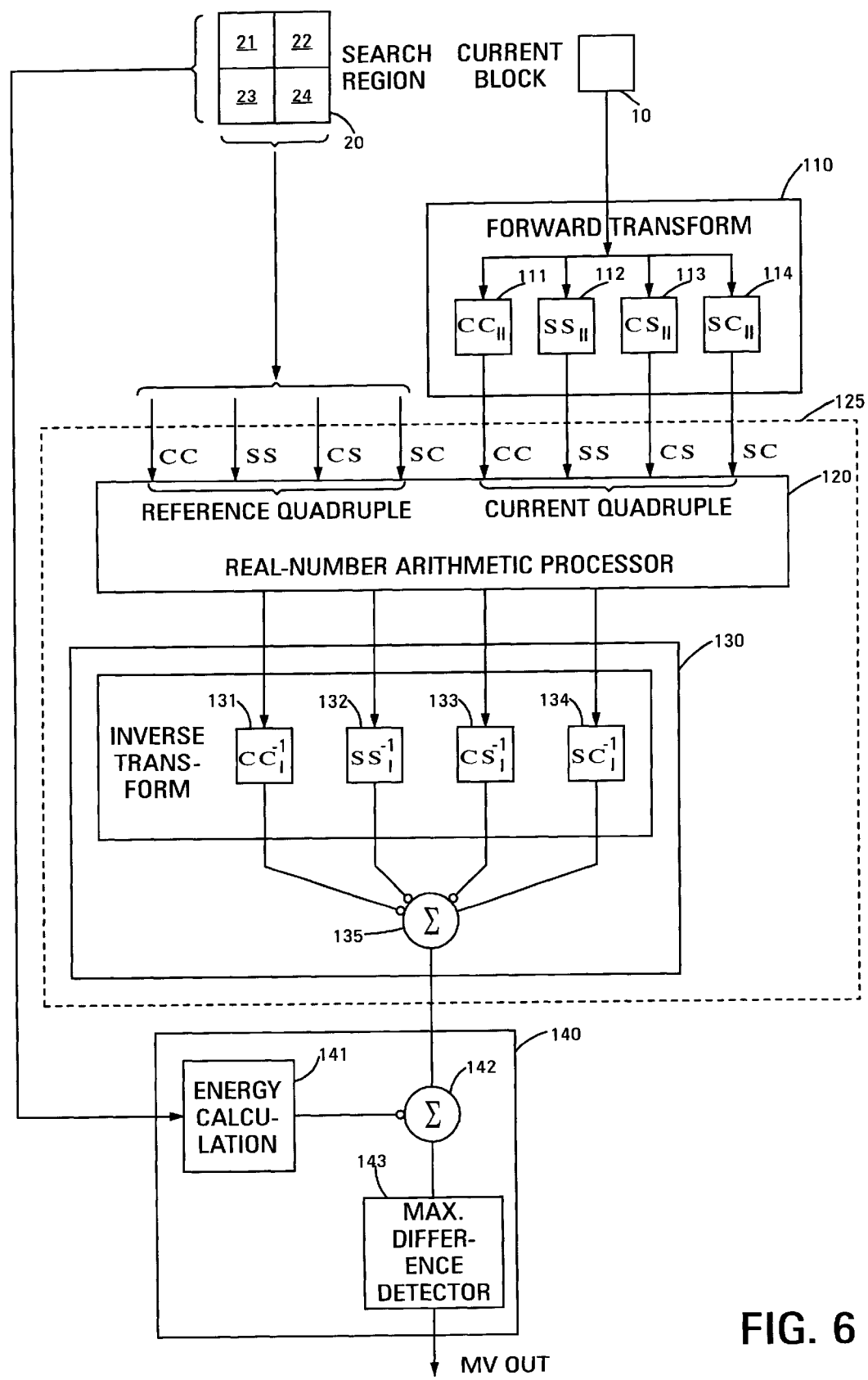
FIG. 6 shows a first embodiment 100 of a motion estimation apparatus according to the invention.

FIG. 6 shows a first embodiment 100 of a motion estimation apparatus according to the invention. The motion estimation apparatus performs the motion estimation method according to the invention to determine a motion vector for the current block 10.

The motion estimation apparatus 100 is composed of the forward transform module 110, the real-number arithmetic processor 120, the inverse transform module 130 and the motion vector determining module 140. The forward transform module has inputs through which it receives the current block 10 and the search region blocks 21–24. The forward transform module has outputs through which it delivers a quadruple of transform coefficient blocks generated from the current block, i.e., the current quadruple, to corresponding inputs of the real-number arithmetic processor. The real-number arithmetic processor has additional inputs through which it receives a quadruple of transform coefficient blocks generated from four of the search region blocks of the search region 20, i.e., the reference quadruple. In the example shown, the search region blocks 21–24 constitute the four of the search region blocks. The real-number arithmetic processor additionally has outputs through which it delivers a quadruple of processed transform coefficient blocks to corresponding inputs of the inverse transform module. The inverse transform module has an output through which it delivers a block of exact cross-correlations to a corresponding input of the motion vector determining module. The block of exact cross-correlations is composed of an exact cross-correlation between the current block and each of the potential reference blocks in the search region. The motion vector determining module had an additional input through which it receives the search region blocks, and has an output through which it delivers the motion vector for the current block.

The forward transform module 110 is composed of the forward transform processors 111–114. The forward transform processors 111–114 collectively apply discrete cosine/sine transforms (DCT/DST) of a first type to the current block to generate the current quadruple. The forward transform module applies no zero padding to the current block before performing the DCTs and DSTs, but selectively adds rows, columns or rows and columns of zero-valued coefficients to the blocks of N×N transform coefficients generated by the DCT and DST processing, where N is equal to M, the number of pixels horizontally and vertically of the current block 10 and is also the size of the search region blocks 21–24. Thus, the current quadruple is composed of four blocks of (N+1)×(N+1) transform coefficients. In the example shown, the forward transform processor 111 applies a two-dimensional discrete cosine transform (DCT) to the current block, the forward transform processor 112 applies a two-dimensional discrete sine transform (DST) to the current block, the forward transform processor 113 applies a two-dimensional mixed cosine-sine transform (CST) to the current block and the forward transform processor 114 applies a two-dimensional mixed cosine-sine transform (SCT) to the current block. Thus, the current quadruple collectively generated by the forward transform processors is composed of one block of DCT coefficients, one block of DST coefficients, one block of mixed CST coefficients and one block of mixed SCT coefficients. Each of the blocks of transform coefficients is a two-dimensional array of (N+1)×(N+1) transform coefficients, where N is equal to M, the number of pixels horizontally and vertically of the current block 10 and is also the size of the search region blocks 21–24.

The forward transforms of the first type applied by the transform processors 111–114 of the forward transform module 110 are discrete cosine transforms, discrete sine transforms, mixed cosine-sine transforms and mixed sine-cosine transforms of Type IIe according to Wang's above-mentioned classification of discrete trigonometric transforms.

The forward transform module 110 feeds the current quadruple to the real-number arithmetic processor 120. The real-number arithmetic processor additionally receives the reference quadruple, which is a quadruple of transform coefficient blocks generated from four of the search region blocks in the search region 20, i.e., the search region blocks 21–24 in this example. The real-number arithmetic processor performs selective additions, multiplications and sign inversions on the transform coefficient blocks constituting the current and reference quadruples using only real-number arithmetic to generate a single quadruple of processed transform coefficient blocks. The structure of the real-number arithmetic processor will be described in detail below with reference to FIG. 8.

The real-number arithmetic processor 120 feeds the quadruple of processed transform coefficient blocks to the inverse transform module 130. The real-number arithmetic processor and the inverse transform module collectively constitute the DCT/DST-based cross-correlation (CSCC) module 125.

The inverse transform module 130 is composed of the inverse transform processors 131–134 and the summing module 135. The inverse transform processors have inputs connected to receive the quadruple of processed transform coefficient blocks from the output of the real-number arithmetic processor 120 and outputs connected to the summing module 135. The summing module has an output connected to one input of the motion vector determining module 140.

The inverse transform processors 131–134 apply inverse discrete cosine/sine transforms (IDCT/IDST) of a second type to the quadruple of processed transform coefficient blocks to generate four blocks of cross-correlation components. In the example shown, the inverse transform processor 131 applies an inverse discrete cosine transform (IDCT) to the block of DCT coefficients of the quadruple of processed transform coefficient blocks, the inverse transform processor 132 applies an inverse discrete sine transform (IDST) to the block of DST coefficients of the quadruple of processed transform coefficient blocks, the inverse transform processor 133 applies a mixed inverse cosine-sine transform (ICST) to the block of CST coefficients of the quadruple of processed transform coefficient blocks and the inverse transform processor 134 applies an inverse mixed cosine-sine transform (SCT) to the block of SCT coefficients of the quadruple of processed transform coefficient blocks. The inverse transform processors feed the resulting blocks of cross-correlation components to the inputs of the summing module 135.

The summing module 135 is configured to subtract the blocks of cross-correlation components generated by the inverse transform processors 131, 132 and 133 from the block of cross-correlation components generated by the inverse transform processor 134. The output of the summing module is a single block of cross-correlations in which each element represents an exact cross-correlation between the current block and a different potential reference block in the search region 20.

The inverse transforms of the second type performed by the inverse transform processors 131–134 of the inverse transform module 130 are inverse discrete cosine transforms, inverse discrete sine transforms, inverse mixed cosine-sine transforms and inverse mixed sine-cosine transforms of Type Ie according to Wang's above-mentioned classification of discrete trigonometric transforms. The inverse transform module feeds the block of cross-correlations to the motion vector determining module 140.

The motion vector determining module 140 is composed of the energy calculation module 141, the summing module 142 and the maximum difference detector 143. The energy calculation module has an input connected to receive the pixel values of the search region 20 and an output connected to the sign-inverting input of the summing module 142. The normal input of the summing module is connected to the output of the inverse transform module 130 through which it receives the block of cross-correlations. The output of the summing module is connected to the input of the difference detector 142. The output of the difference detector provides the motion vector for the current block as the output of the motion vector determining module.

The motion vector determining module 140 receives the block of cross-correlations from the inverse transform module 130 and also receives the pixel values of the search region 20. The pixel values of the search region are fed to the energy calculation module, which calculates an energy for each potential reference block in the search range. The energy may be calculated by recursion, using, for example, the method disclosed by E. Linzer, P. Tiwari, and M. Zubair in High Performance Algorithms for MPEG Motion Estimation, ICASSP, 1996. In the example shown, in which the size of the search range, horizontally and vertically, is equal to that of the current block, the result of the energy calculation is an M×M block of energy values composed of one energy value for each potential reference block.

The energy calculation module 141 feeds the block of energy values to the sign-inverting input of the summing module 142. The summing module also receives the block of cross-correlations from the inverse transform module 130 at its normal input. The two blocks are of equal size and have corresponding elements in locations that correspond or are related in a known manner. The summing module effectively subtracts each energy value in the block of energies from twice the corresponding cross-correlation. The summing module feeds the resulting block of differences to the maximum difference detector 143.

The maximum difference detector examines the block of differences to determine the maximum difference, and outputs the coordinates of potential reference block for which the difference in the block of differences was a maximum as the motion vector for the current block. When the locations of the differences in the block of differences correspond to the locations of the energy values in the block of energies and the cross-correlations in the block of cross-correlations, the coordinates of the maximum difference in the block of differences can be output as the motion vector for the current block.

The modules of the motion estimation apparatus will now be described in more detail with reference to FIGS. 7A–7E, 8, 9A–9E, 10A, 10B, 11A and 11B.

The forward transform module 110 will be described first with reference to FIGS. 7A–7E. As noted above, the forward transforms of the first type applied by the transform processors 111–114 of the forward transform module 110 are DCTs, DSTs, CSTs and SCTs of Type IIe. Such forward transforms operate on a block of N×N pixel values, and each generates a block of N×N transform coefficients. The discrete cosine transforms generate a block of N×N transform coefficients extending from 0 to N−1, horizontally and vertically; the discrete sine transforms generate a block of N×N transform coefficients extending from 1 to N, horizontally and vertically; the mixed cosine-sine transforms generate a block of N×N transform coefficients extending from 1 to N, horizontally and 0 to N−1, vertically; and the mixed sine-cosine transforms generate a block of N×N transform coefficients extending from 0 to N−1, horizontally, and 1 to N, vertically.

However, Type Ie inverse transforms of the second type operate differently. A Type Ie IDCT processor generates a block of (N+1)×(N+1) pixel values from a block of (N+1)×(N+1) DCT coefficients, a Type Ie IDST processor generates a block of (N−1)×(N−1) pixel values from a block of (N−1)×(N−1) DST coefficients, a Type Ie ICST processor generates a block of (N+1)×(N−1) pixel values from a block of (N+1)×(N−1) CST coefficients and Type Ie ISCT processor generates a block of (N−1)×(N+1) pixel values from a block of (N−1)×(N+1) SCT coefficients. To simplify facilitate the operation of the inverse transform module 130 of the motion estimation apparatus 100, the transform processors 111–114 assign zero-valued coefficients to the places in the [0, N]×[0, N] output domain not defined by the original forward transforms and perform all subsequent processing using blocks of (N+1)×(N+1) transform coefficients.

Figure 7A:
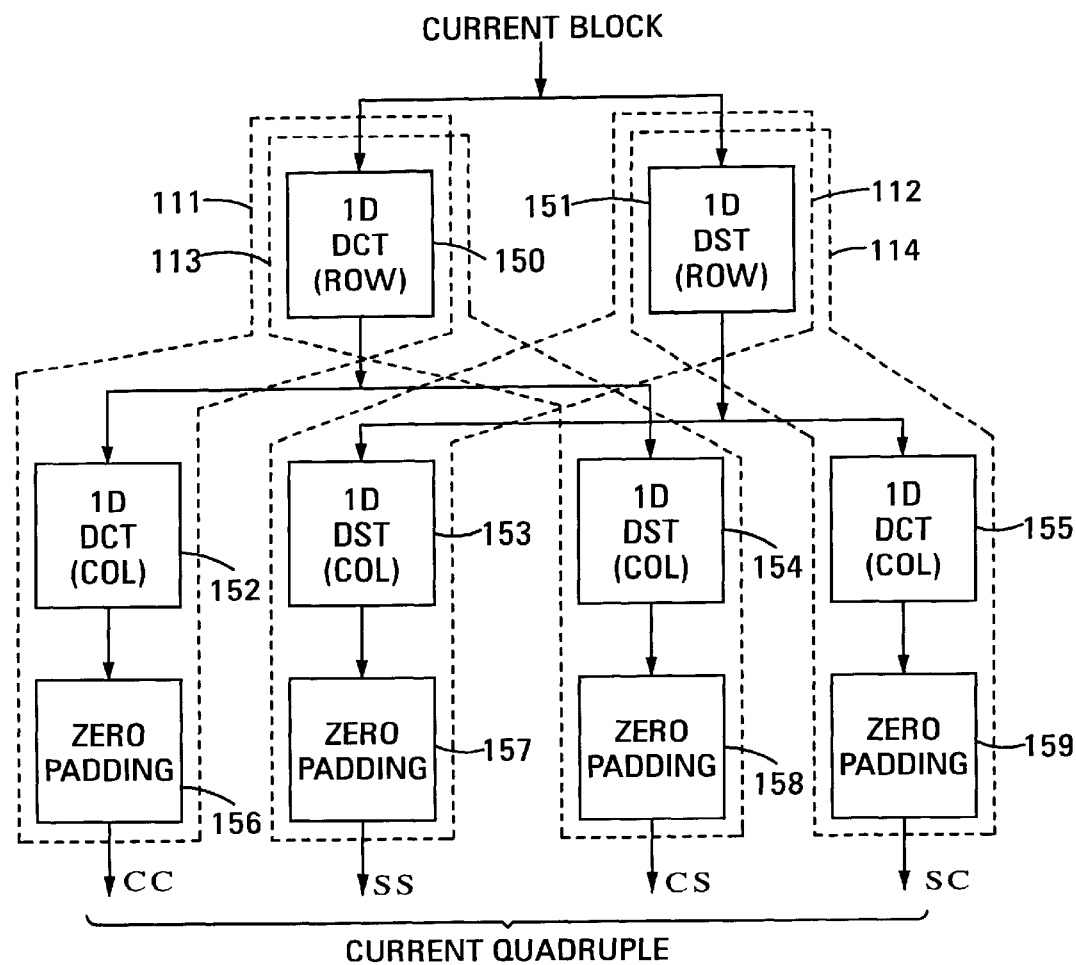
FIG. 7A shows an example of the orthogonal transform module of the motion estimation apparatus shown in FIG. 6.

FIG. 7A shows an example of the structure of the transform processors 111–114. The transform processors 111–114 are composed of the one-dimensional discrete cosine transform (1D-DCT) modules 150, 152 and 155, the one-dimensional discrete sine transform (1D-DST) modules 151, 153 and 154 and the zero-padding modules 156, 157, 158 and 159. The 1D-DCT and 1D-DST modules respectively perform one-dimensional discrete cosine transforms and discrete sine transforms of Type IIe. The 1D-DCT module 150 and the 1D-DST module 151 have inputs connected to receive the current block. The output of the 1D-DCT module 150 is connected to the inputs of the 1D-DCT module 152 and the 1D-DST module 154. The output of the 1D-DST module 151 is connected to the inputs of the 1D-DST module 153 and the 1D-DCT module 155. The outputs of the 1D-DCT module 152, the 1D-DST module 153, the 1D-DST module 154 and the 1D-DCT module 154 are respectively connected to the inputs of the zero-padding modules 156, 157, 158 and 159.

Alternatively, the 1D-DCT module 150 and the 1D-DST module 151 may process the columns of the current block; the 1D-DCT module 152 and the 1D-DST module 154 may process the rows of the blocks generated by the 1D-DCT module 150 and the 1D-DST module 153 and the 1D-DCT module 155 may process the rows of the blocks generated by the 1D-DST module 151.

Figures 7B, 7C, 7D, 7E:
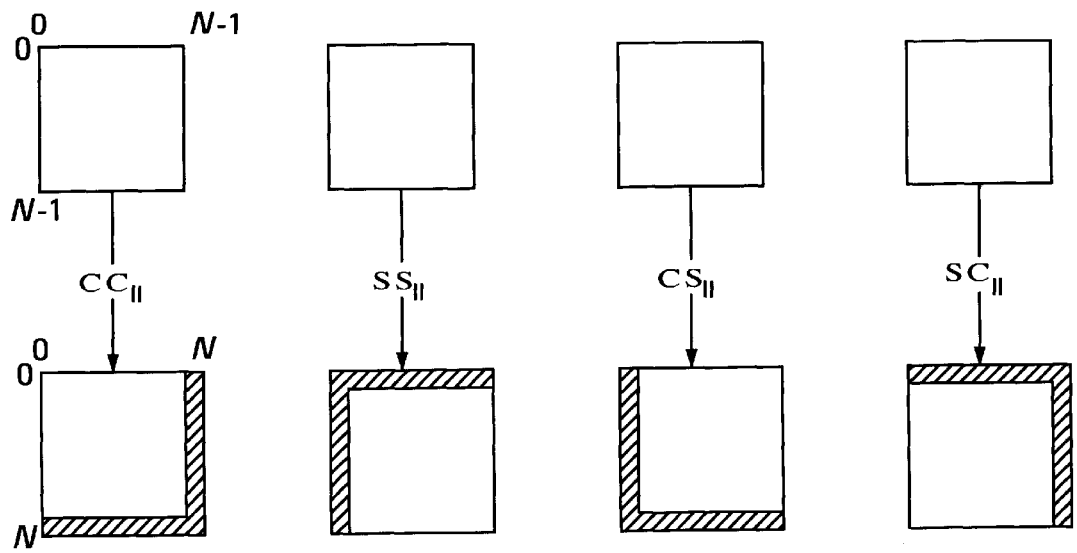
FIGS. 7B–7E illustrate the post-transformation zero padding applied to the blocks of transform coefficients by the forward transform module shown in FIG. 7A.

The serial arrangement of the 1D-DCT module 150, the 1D-DCT module 152 and the zero padding module 156 constitute the transform processor 111. The 1D-DCT module 150 applies a 1D-DCT of Type IIe to the rows of the current block and the 1D-DCT module 152 applies a 1D-DCT of Type IIe to the columns of the transform coefficient block generated by the 1D-DCT module 150 to generate a two-dimensional block of N×N DCT coefficients. The zero padding module 156 then adds an (N+1)-th row of zero-valued coefficients and an (N+1)-th column of zero-valued coefficients to the block of DCT coefficients to generate a block of (N+1)×(N+1) DCT coefficients, as shown in FIG. 7B. The locations of the zero-value coefficients are indicated by shading in FIGS. 7B–7E.

The serial arrangement of the 1D-DST module 151, the 1D-DST module 153 and the zero padding module 157 constitute the transform processor 112. The 1D-DST module 151 applies a 1D-DST of Type IIe to the rows of the current block and the 1D-DST module 153 applies a 1D-DST of Type IIe to the columns of the transform coefficient block generated by the 1D-DST module 151 to generate a two-dimensional block of N×N DST coefficients. The zero padding module 157 then adds the two-dimensional block of N×N DST coefficients to a 0-th row of zero-valued coefficients and a 0-th column of zero-valued coefficients to generate a block of (N+1)×(N+1) DST coefficients, as shown in FIG. 7C.

The serial arrangement of the 1D-DCT module 150, the 1D-DST module 154 and the zero padding module 158 constitute the transform processor 113. The 1D-DCT module 150 applies a 1D-DCT of Type IIe to the rows of the current block and the 1D-DST module 154 applies a 1D-DST of Type IIe to the columns of the transform coefficient block generated by the 1-DDCT module 150 to generate a two-dimensional block of N×N CST coefficients. The zero padding module 158 then adds the two-dimensional block of N×N DST coefficients to a 0-th column of zero-valued coefficients and adds an (N+1)-th row of zero-valued coefficients to the block to generate a block of (N+1)×(N+1) CST coefficients, as shown in FIG. 7D.

The serial arrangement of the 1D-DST module 151, the 1D-DCT module 155 and the zero padding module 156 constitute the transform processor 114. The 1D-DST module 151 applies a 1D-DST of Type IIe to the rows of the current block and the 1D-DCT module 155 applies a 1D-DCT of Type IIe to the columns of the transform coefficient block generated by the 1D-DST module 151 to generate a two-dimensional block of N×N SCT coefficients. The zero padding module 158 then adds the two-dimensional block of N×N SCT coefficients to a 0-th row of zero-valued coefficients and adds an (N+1)-th column of zero-valued coefficients to generate a block of (N+1×N+1) SCT coefficients, as shown in FIG. 7E.

The Type IIe trigonometric transforms with single row and column zero-padding performed by the transform processors 111–114 and 115–118 will be denoted as $CC_{II}$, $SS_{II}$, $CS_{II}$ and $SC_{II}$ transforms, respectively.

Figure 8:
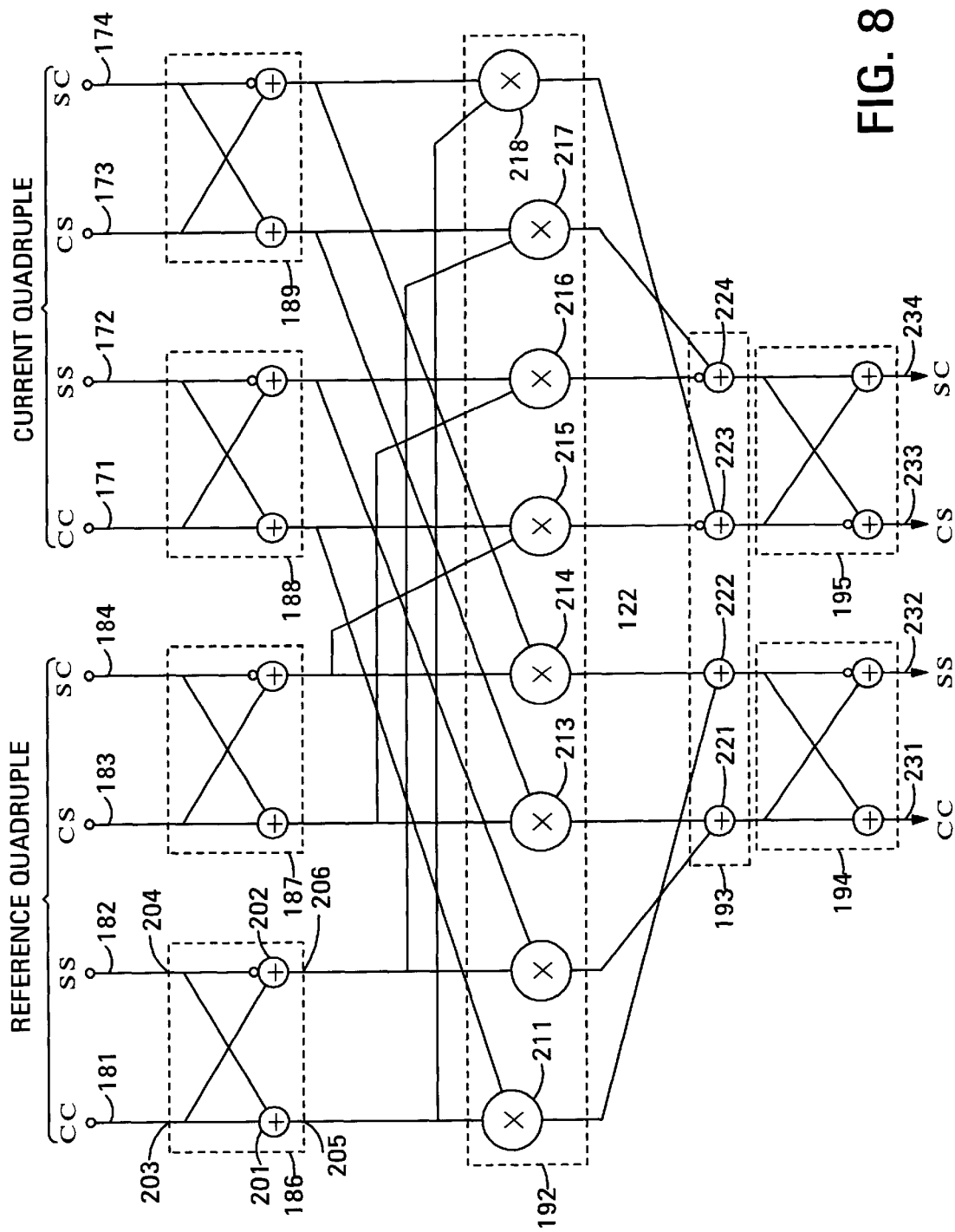
FIG. 8 is a block diagram showing the real-number arithmetic processor of the motion estimation apparatus shown in FIG. 6.

FIG. 8 is a block diagram showing the real-number arithmetic processor 120. The real-number arithmetic processor is composed of the butterfly modules 186, 187, 188 and 189, the set 192 of eight multiplying modules, the set 193 of four summing modules and the butterfly modules 194 and 195. In FIG. 8, a small circle on the input connection of a module indicates that the input is a sign-inverting input that inverts the sign of the signal on the input before the module performs its indicated operation. Thus, for example, a summing module having a sign- inverting input subtracts the signal on the sign-inverting input from the signal on its normal input and is, in effect, a subtraction module.

The butterfly module 186 will now be described as an example of the butterfly modules 186–189, 194 and 195. The butterfly module 186 is composed of the summing modules 201 and 202 of which the summing module 202 has one sign-inverting input. The butterfly module has two inputs, the normal input 203 connected to one normal input of the summing module 201 and the normal input of summing module 202, and the sign-inverting input 204 connected to the other normal input of the summing module 201 and to the sign-inverting input of the summing module 202. The outputs of the summing modules 201 and 202 respectively provide the sum output 205 and the difference output 206 of the butterfly module 186. If the input signals on the normal input 203 and the sign-inverting input 204 are A and B, respectively, the output on the sum output 205 is A+B and that on the difference output 206 is {A+(−B)}=A−B.

The butterfly modules 186 and 187 receive the reference quadruple via the connections 181–184. Of the transform coefficient blocks of the reference quadruple, the block of DCTs is fed to the normal input of the butterfly module 186, the block of DSTs is fed to the sign-inverting input of the butterfly module 186, the block of CSTs is fed to be normal input of the butterfly module 187 and the block of SCTs is fed to the sign-inverting input of the butterfly module 187.

The butterfly modules 188 and 189 receive the current quadruple via the input connections 171–174. Of the transform coefficient blocks of the current quadruple, the block of DCT coefficients is fed to the normal input of the butterfly module 188, the block of DST coefficients is fed to the sign-inverting input of the butterfly module 188, the block of CST coefficients is fed to the normal input of the butterfly module 189 and the block of SCT coefficients is fed to the sign-inverting input of the butterfly module 189.

TABLE 1

| | Butterfly Module | | |
|---|---|---|---|
| Source | Module No. | Output | Multiplying Module |
| Reference Quadruple | 186 | Sum | 211 |
| | | | 218 |
| | | Difference | 212 |
| | | | 217 |
| | 187 | Sum | 213 |
| | | | 216 |
| | | Difference | 214 |
| | | | 215 |
| Current Quadruple | 188 | Sum | 215 |
| | | | 211 |
| | | Difference | 216 |
| | | | 212 |
| | 189 | Sum | 217 |
| | | | 213 |
| | | Difference | 218 |
| | | | 214 |

Each output of the butterfly modules 186–189 is connected to the inputs of two of the multiplying modules 211–218 in the set 192 of multiplying modules. The connections between the butterfly modules and the multiplying modules are shown in table 1.

The outputs of the multiplying modules are connected to the inputs of the four summing modules 221–224 in the set 193 of multiplying modules as shown in Table 2.

TABLE 2

| Multiplying Module | Summing Module | |
|---|---|---|
| | Module No. | X = Sign-inverting input |
| 211 | 222 | |
| 212 | 221 | |
| 213 | 221 | |
| 214 | 222 | |
| 215 | 223 | X |
| 216 | 224 | X |
| 217 | 224 | |
| 218 | 223 | |

The outputs of the summing modules 221–224 are connected to the inputs of the butterfly modules 194 and 195 as shown in Table 3.

TABLE 3

| Summing Module | Butterfly Module | |
|---|---|---|
| | Module No. | Input |
| 221 | 194 | normal |
| 222 | | sign-inverting |
| 223 | 195 | normal |
| 224 | | sign-inverting |

The outputs of the butterfly modules 194 and 195 supply the quadruple of processed transform coefficient blocks to the output of the real-number arithmetic processor 120 on the connections 231, 232, 233 and 234. In this, the sum and difference outputs of the butterfly module 194 respectively supply the blocks of DCT coefficients and DST coefficients on the connections 231 and 232, and the difference and sum outputs of the butterfly module 195 respectively supply the blocks of CST coefficients and SCT coefficients on the connections 233 and 234.

It can be seen from the above description that, since the transform coefficients generated by the forward transform module 110 are all real numbers and the transform coefficients constituting the reference quadruple are also all real numbers, the real-number arithmetic processor 120 processes the reference quadruple and the current quadruple using only multiplication and summing of real numbers. Implementation of the real-number arithmetic processor is therefore substantially simpler than a module that attempts to provide equivalent results by processing complex numbers.

The inverse transform module 130 will now be described with reference to FIGS. 9A–9E. As noted above, the inverse transforms of the second type applied by the inverse transform processors 131–134 of the inverse transform module are modified IDCTs, IDSTs, ICSTs and ISCTs of Type Ie. Conventional inverse transforms of this type generate a block of $(N+1) \times (N+1)$ pixel values from a block of $(N+1) \times (N+1)$ DCT coefficients, a block of $(N-1) \times (N-1)$ pixel values from a block of $(N-1) \times (N-1)$ DST coefficients, a block of $(N+1) \times (N-1)$ pixel values from a block of $(N+1) \times (N-1)$ CST coefficients and a block of $(N-1) \times (N+1)$ pixel values from a block of $(N-1) \times (N+1)$ SCT coefficients, respectively.

In the inverse transform module 130, the blocks of DCT coefficients, DST coefficients, CST coefficients and SCT coefficients constituting the quadruple of processed transform coefficients received from the real-number arithmetic processor 120 are blocks of $(N+1) \times (N+1)$ transform coefficients. However, as a result of the one-row and one-column zero padding applied by the forward transform module 110, the blocks DST coefficients, CST coefficients and SCT coefficients include at least one row and one column of zero-value coefficients, as shown by the elements marked DST, CST and SCT in FIGS. 9C–9E, in which the locations of the zero-value coefficients are indicated by shading. Thus, in these blocks, the non zero-value coefficients are located in accordance with the requirements of conventional inverse transforms of Type Ie.

The inverse transform processors 131–134 apply inverse transforms of Type Ie that are modified so that all will operate on square blocks of $(N+1) \times (N+1)$ transform coefficients that have zero-value coefficients located in the rows and columns indicated by shading in FIGS. 9B–9E. The inverse transforms of Type Ie are also modified so that, when fed with the blocks of transform coefficients shown in FIGS. 9B–9E, they generate square blocks of $(N+1) \times (N+1)$ cross-correlation components in which zero-value cross-correlation components are located in the rows and columns indicated by shading in FIGS. 9B–9E. In these FIGS., the blocks of cross-correlation components are indicated as XCCs.

Figure 9A:
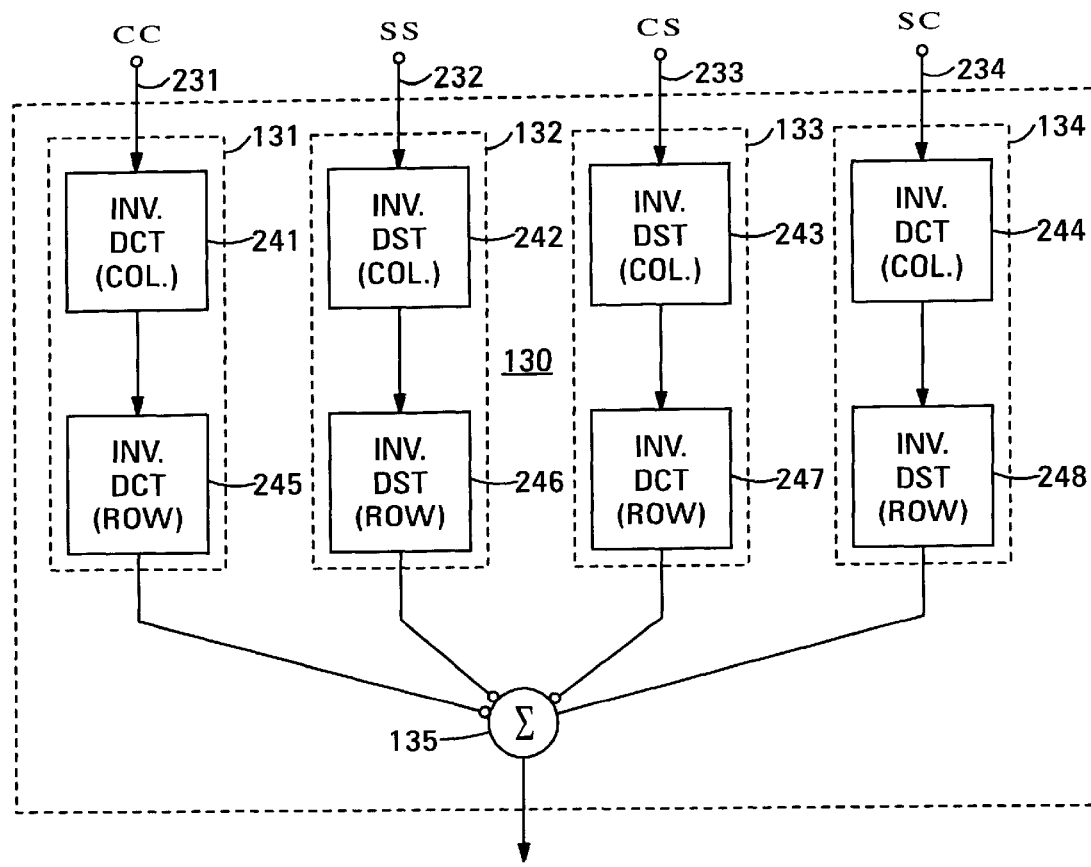
FIG. 9A shows an example of the inverse transform module of the motion estimation apparatus shown in FIG. 6.

FIG. 9A shows an example of the structure of the inverse transform processors 131–134.

Figure 9B:
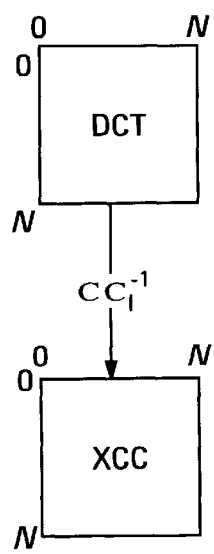
FIGS. 9B–9E illustrate the location of the zero-valued transform coefficients and cross-correlation components in the processing performed by the inverse transform module shown in FIG. 9A.

The inverse transform processor 131 is composed of a serial arrangement of the one-dimensional inverse discrete cosine transform (1D-IDCT) module 241 and the 1D-IDCT module 245. The 1D-IDCT module 241 receives the block of DCT coefficients from the real-number arithmetic processor 120. The block is composed of $(N+1) \times (N+1)$ DCT coefficients. The 1D-IDCT module 241 applies a 1D-IDCT of Type Ie to the columns of the block of DCT coefficients to generate a block of transform coefficients. The 1D-IDCT module 245 applies a 1D-IDCT of Type Ie to the rows of the block of transform coefficients it receives from the 1D-IDCT module 241 to generate a two-dimensional block of $(N+1) \times (N+1)$ cross-correlation components XCC, as shown in FIG. 9B.

Figure 9C:
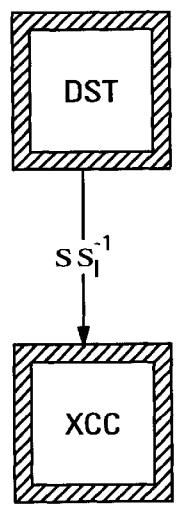

The inverse transform processor 132 is composed of a serial arrangement of the one-dimensional inverse discrete sine transform (1D-IDST) module 242 and the 1D-IDST module 246. The 1D-IDST module 242 receives a block of DST coefficients from the real-number arithmetic processor 120. The block is composed of $(N+1) \times (N+1)$ DST coefficients of which the coefficients in the 0-th and N-th rows and columns are zero-value coefficients, as shown in FIG. 9C in which the zero-value coefficients are indicated by shading. The 1D-IDST module 242 applies a 1D-IDST of Type Ie to the columns of the block of DST coefficients to generate a block of transform coefficients. The 1D-IDST module 246 applies a 1D-IDST of Type Ie to the rows of the block of transform coefficients it receives from the 1D-IDST module 242 to generate a two-dimensional block of $(N+1) \times (N+1)$ cross-correlation components of which the cross-correlation components in the 0-th and N-th rows and columns have values of zero, as shown in FIG. 9C in which the zero-value cross-correlation components are indicated by shading.

Figure 9D:
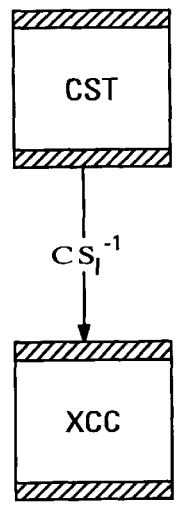

The inverse transform processor 133 is composed of a serial arrangement of the 1D-IDST module 243 and the 1D-IDCT module 247. The 1D-IDST module 243 receives the block of CST coefficients from the real-number arithmetic processor 120. The block is composed of $(N+1) \times (N+1)$ CST coefficients of which the coefficients in the 0-th and N-th rows are zero-value coefficients, as shown in FIG. 9D in which the zero-value coefficients are indicated by shading. The 1D-IDST module 243 applies a 1D-IDST of Type Ie to the columns of each block of CST coefficients to generate a block of transform coefficients. The 1D-IDCT module 247 applies a 1D-IDCT of Type Ie to the rows of the block of transform coefficients it receives from the 1D-IDST module 243 to generate a two-dimensional block of (N+1)×(N+1) cross-correlation components of which the cross-correlation components in the 0-th and N-th rows have values of zero, as shown in FIG. 9D in which the zero-value cross-correlation components are indicated by shading.

Figure 9E:
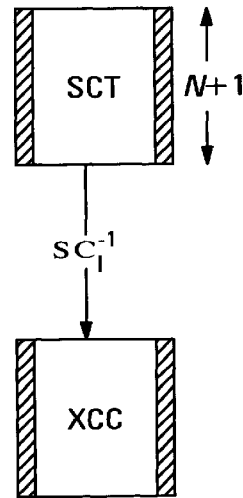

The inverse transform processor 134 is composed of a serial arrangement of the 1D-IDCT module 244 and the 1D-IDST module 248. The 1D-IDCT module 244 receives the block of SCT coefficients from the real-number arithmetic processor 120. The block is composed of (N+1)×(N+1) SCT coefficients of which the coefficients in the 0-th and N-th columns are zero-value coefficients, as shown in FIG. 9E in which the zero-value coefficients are indicated by shading. The 1-DIDCT module 244 applies a 1D-IDCT of Type Ie to the columns of the block of SCT coefficients to generate a block of transform coefficients. The 1D-IDST module 248 applies a 1D-IDST of Type Ie to the rows of the block of transform coefficients it receives from the 1D-IDCT module 244 to generate a two-dimensional block of (N+1)×(N+1) cross-correlation components of which the cross-correlation components in the 0-th and N-th columns have values of zero, as shown in FIG. 9E in which the zero-value cross-correlation components are indicated by shading.

Alternatively, the modules 241, 242, 243 and 244 may inversely transform the rows of the blocks of coefficients received from the real-number arithmetic module 120, and the modules 245, 246, 247 and 248 may inversely transform the coumns of the blocks of transform coefficients generated by the modules 241, 242, 243 and 244 to generate respective blocks of cross-correlation components.

The Type Ie trigonometric transforms performed by the inverse transform processors 131–134 are denoted as $CC_I^{-1}$, $SS_I^{-1}$, $CS_I^{-1}$, and $SC_I^{-1}$ transforms, respectively.

The blocks of cross-correlation components generated by the inverse transform processors 131–134 are fed to the summing module 135, which sums them to generate the block of cross-correlations, as described above.

Figure 10A:
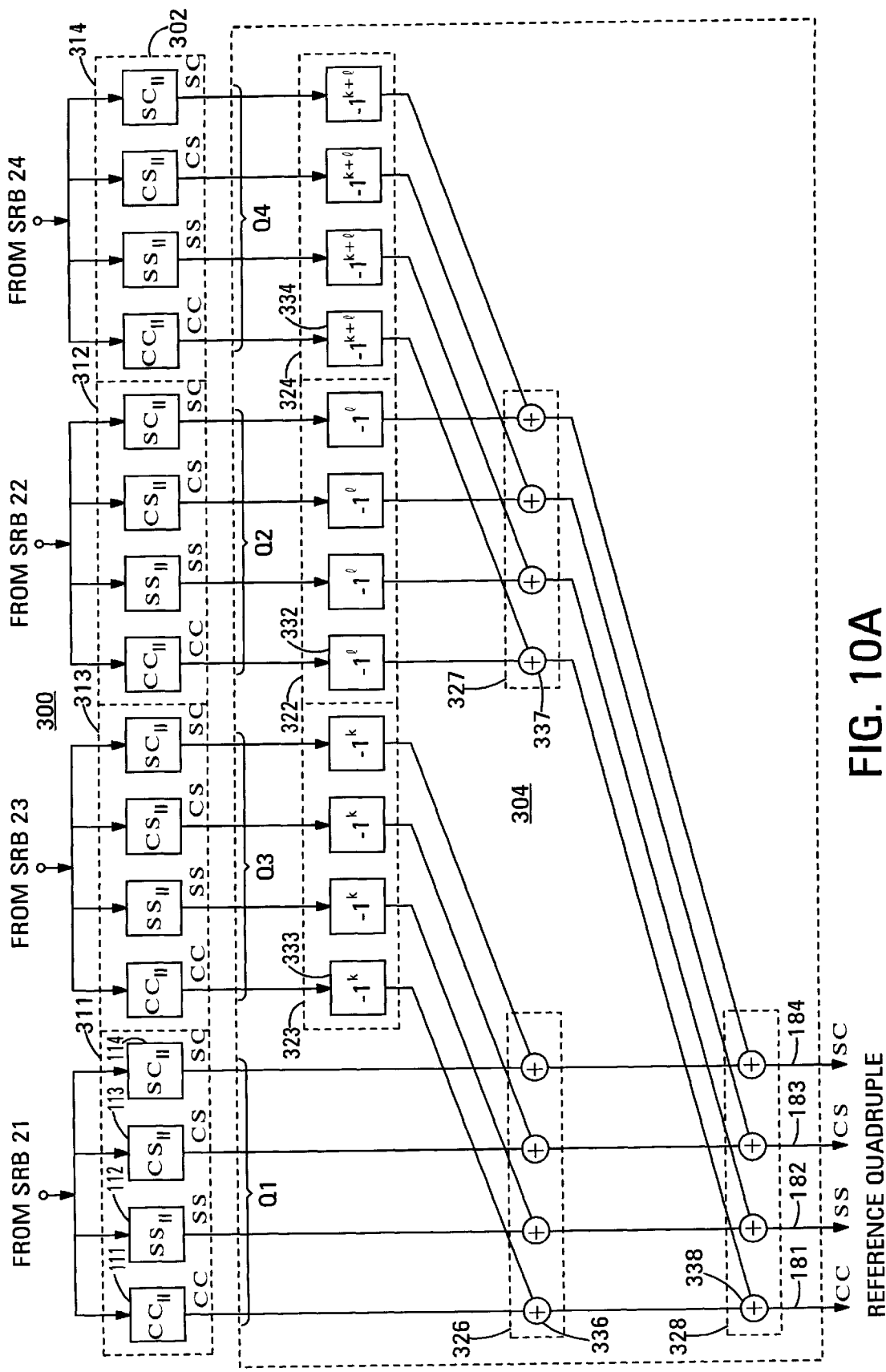
FIG. 10A is a block diagram showing an embodiment of a reference quadruple generating module that can be used to orthogonally transform the search region blocks during processing of the current block.

In the above-described embodiment 100 of the motion estimation apparatus according to the invention, the real-number arithmetic processor 120 processes the current quadruple and a reference quadruple, which is a quadruple of transform coefficient blocks generated from four of the search region blocks. As noted above, the reference quadruple may be obtained by orthogonally transforming anew the search region blocks or by storing previously-generated quadruples of transform coefficient blocks generated from the reference picture. FIG. 10A shows an embodiment 300 of a reference quadruple generating module that can be used to orthogonally transform the search region blocks during processing of the current block.

The reference quadruple generating module 300 is composed of the orthogonal transform module 302 and the folding module 304. In the embodiment shown, the orthogonal transform module is composed of the forward transform modules 311, 313, 312 and 314. Each of the forward transform modules has the same structure as the forward transform module 110 described above with reference to FIG. 6. The exemplary forward transform module 311 is shown as being composed of the transform processors 111, 112, 113 and 114, described above with reference to FIGS. 7A–7E. The forward transform modules 312, 313 and 314 have the same structure.

The forward transform module 311 is connected to receive the pixel values of the search region block 21, indicated as SRB 21 in FIG. 10A. The forward transform processors 111, 112, 113 and 114 collectively apply discrete cosine/sine transforms (DCT/DST) of the first type to the search region block to generate a quadruple of blocks of (N+1)×(N+1) transform coefficients. In the example shown, the forward transform processor 111 applies a discrete cosine transform (DCT) to the search region block 21, the forward transform processor 112 applies a discrete sine transform (DST) to the search region block 21, the forward transform processor 117 applies a mixed cosine-sine transform (CST) to the search region block 21 and the forward transform processor 118 applies a mixed cosine-sine transform (SCT) to the search region block 21. Transforming the search region block 21 using the forward transform module 311 generates quadruple of transform coefficient blocks composed of a block of DCT coefficients, a block of DST coefficients, a block of CST coefficients and a block of SCT coefficients.

The forward transform modules 312, 313 and 314 are connected to receive the pixel values of the search region blocks 22, 23 and 24, respectively indicated in FIG. 10A as SRB 22, SRB 23 and SRB 24, and generate from each search region block a respective quadruple of transform coefficient blocks as described above.

Each of the forward transform modules 311–314 has a set of four outputs, one for each of the forward transform processors. The sets of outputs of the forward transform modules 311, 312, 313 and 314 are respectively connected to the input sets Q1, Q2, Q3 and Q4 of the folding module 304.

In a practical embodiment, the number of forward transform modules can be reduced by using the forward transform module 110 to transform the four search region blocks in addition to transforming the current block. If this is done, sufficient buffer memory to store four quadruples of transform coefficient blocks must be provided. As a further alternative, the current block can be transformed using one forward transform module, and all four search region blocks can be transformed using another forward transform module and sufficient buffer memory to store three quadruples of transform coefficient blocks.

The orthogonal transform module 302 generates a quadruple of transform coefficient.blocks from each of the four search region blocks and feeds one of the quadruples of transform coefficient blocks to each of the input sets Q1, Q2, Q3 and Q4 of the folding module 304.

The folding module 304 will now be described. The folding module is composed of the sets 322, 323 and 324 of sign inversion modules and the sets 326, 327 and 328 of summing modules.

Each of the sets 322, 323 and 324 of sign inversion modules is composed of four sign inversion modules, each corresponding to one of the four transform coefficient blocks in a quadruple of transform coefficient blocks. For example, the sets 322, 323 and 324 of sign inversion modules respectively include the sign inversion modules 332, 333 and 334 that perform sign inversion on the blocks of discrete cosine transform coefficients in the quadruples of transform coefficient blocks generated by the forward transform modules 312, 313 and 314, respectively.

In the set 322 of sign inversion modules, each sign inversion module, such as the sign inversion module 332, has an input connected to the output of one of the transform processors of the forward transform module 312 by a respective input of the input set Q2. Each sign inversion module in the set receives a respective block of transform coefficients and inverts the sign of the transform coefficients located in the odd-numbered columns of the block.

In the set 323 of sign inversion modules, each sign inversion module, such as the sign inversion module 333, has an input connected to the output of one of the transform processors of the forward transform module 313 by a respective input of the input set Q3. Each sign inversion module in the set receives a respective block of transform coefficients and inverts the sign of the transform coefficients located in the odd-numbered rows of the blocks.

In the set 324 of sign inversion modules, each sign inversion module, such as the sign inversion module 334, has an input connected to the output of one of the transform processors of the forward transform module 314 by a respective input of the input set Q4. Each sign inversion module in the set receives a respective block of transform coefficients and inverts the sign of the transform.coefficients located in the odd-numbered rows or in the odd-numbered columns of the block, but not of those located in both an odd-numbered row and an odd-numbered column. Thus, the sign inversion modules in the set 324 effects a checkerboard sign inversion.

Each of the sets 326, 327 and 328 of summing modules is composed of four summing modules, each corresponding to one of the four transform coefficient blocks in a quadruple of transform coefficient blocks. For example, the sets 326, 327 and 328 of summing modules respectively include the summing modules 336, 337 and 338 that each perform summing on blocks of discrete cosine transform coefficients in the quadruples of transform coefficient blocks.

The outputs of the sign-inversion modules in the set 322 are connected to one of the inputs of corresponding ones of the summing modules in the set 327. For example, the output of the sign-inversion module 332 is connected to one input of the summing module 337. The outputs of the sign-inversion modules in the set 324 are connected to the other of the inputs of corresponding ones of the summing modules in the set 327. For example, the output of the sign-inversion module 334 is connected to the other input of the summing module 337. The outputs of the sign-inversion modules in the set 323 are connected to one of the inputs of corresponding ones of the summing modules in the set 326. For example, the output of the sign-inversion module 333 is connected to one input of the summing module 336. The other inputs of the summing modules in the set 326 are each connected to one of the inputs in the input set Q1.

The outputs of the summing modules in the set 326 are connected to one of the inputs of corresponding ones of the summing modules in the set 328. For example, the output of the summing module 336 is connected to one input of the summing module 338. The outputs of the sign-inversion modules in the set 327 are connected to the other of the inputs of corresponding ones of the summing modules in the set 328. For example, the output of the summing module 337 is connected to the other input of the summing module 338.

The outputs of the summing modules in the set 328 provide the reference quadruple that constitutes the output of the folding module 304.

To generate the reference quadruple for the current block, the forward transform modules 311, 312, 313 and 314 generate quadruples of transform coefficient blocks from the search region blocks 21, 22, 23 and 24 and respectively feed them via the inputs Q1, Q2, Q3 and Q4 to the set 326 of summing modules and to the sets 323, 322 and 324 of sign reversal modules.

The sets of sign-inversion modules 322, 323 and 324 perform sign inversion on the quadruples of transform coefficient blocks generated by the forward transform modules 312, 313 and 314, respectively. The set 326 of summing modules sums the quadruple of transform coefficient blocks received via the input Q1 with the quadruple of sign-inverted transform coefficient blocks generated by the set 323 of sign inversion modules. The set 327 of summing modules sums the quadruple of sign-inverted transform coefficient blocks generated by the set 322 of sign inversion modules with the quadruple of sign-inverted transform coefficient blocks generated by the set 324 of sign inversion modules. Finally, the set 328 of summing modules sums the quadruple of summed transform coefficient blocks generated by the set 326 of summing modules with the quadruple of summed transform coefficient blocks generated by the set 327 of summing modules to generate the reference quadruple as the output for the reference quadruple generating module 300. The folding module feeds the reference quadruple to the real-number arithmetic processor 120 via the connections 181, 182, 183 and 184.

In coding schemes in which the reference picture for the current picture is always the picture immediately preceding the current picture in coding order, the processing resources required to orthogonally transform the search region blocks to generate the reference quadruple for the real-number arithmetic processor can be substantially reduced. To effect this reduction, additional hardware resources, in the form of four frame stores, are required.

Figure 10B:
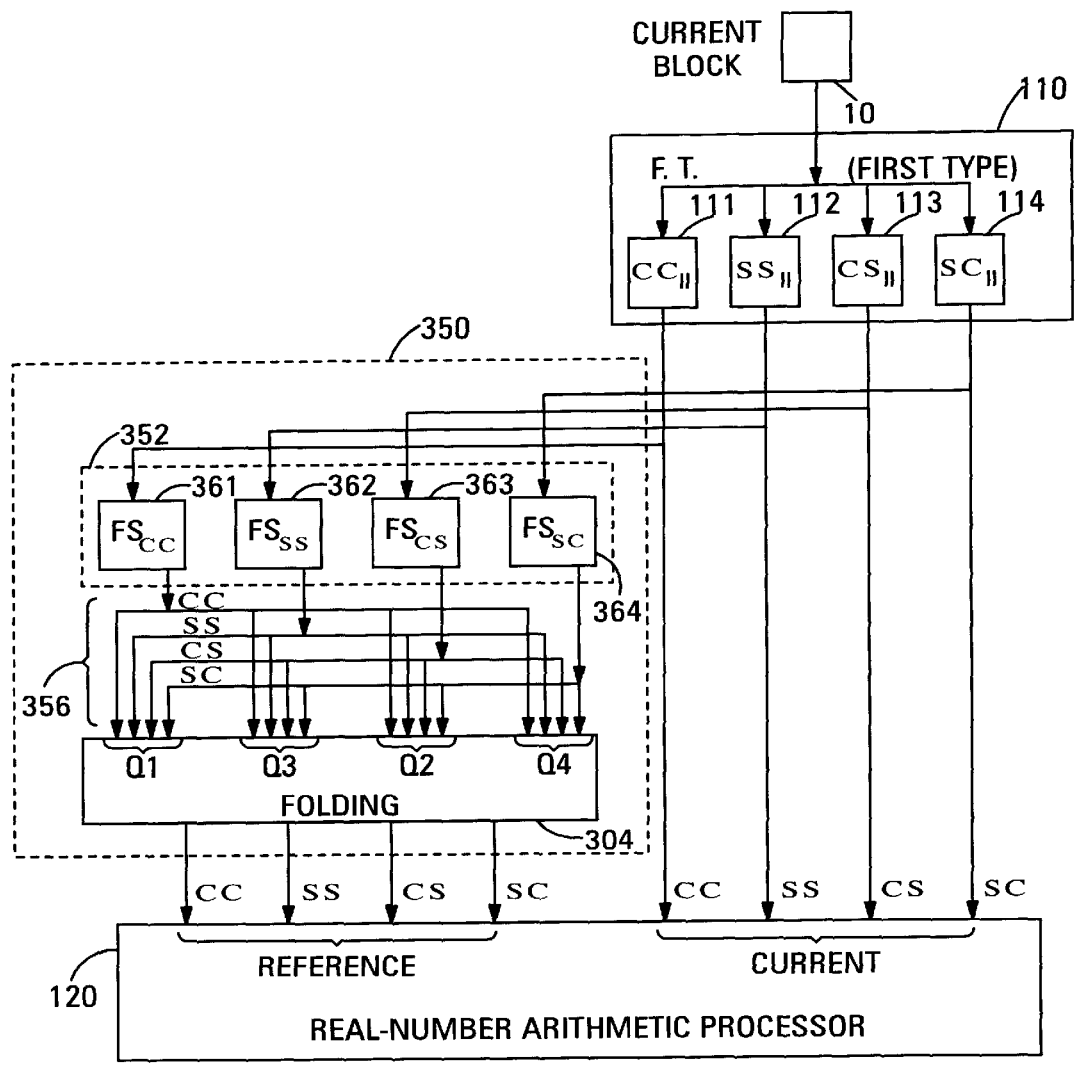
FIG. 10B is a block diagram showing a second embodiment 350 of a reference quadruple generating module that employs four frame stores to store quadruples of transform coefficients generated during processing the previous frame.

FIG. 10B shows a second embodiment 350 of the reference quadruple generating module that employs four frame stores in lieu of the forward transform modules 311–314 of the embodiment shown in FIG. 10A. FIG. 10B also shows the forward transform module 110 and the real-number arithmetic processor of the first embodiment 100 of the motion estimation apparatus according to the invention.

The reference quadruple generating module 350 is composed of the frame store module 352, the folding module 304 and the distribution bus 356. The folding module 304 is identical to the folding module 304 described above and will not be described further. The frame store module 352 is composed of the frame stores 361, 362, 363 and 364 and with control circuitry (not shown) that controls writing into and reading from the frame stores. The frame stores 361, 362, 363 and 364 have inputs respectively connected to the outputs of the transform processors 111, 112, 113 and 114 in the forward transform module 110. The frame stores 361, 362, 363 and 364 each have an output connected by the distribution bus 356 to one of the inputs in each of the input sets Q1, Q2, Q3 and Q4 of the folding module 304.

The first picture of each Group of Pictures (GOP) is independently coded as an I-picture, so that no motion estimation is performed on the first picture. This enables the forward transform module 110 to be used during coding the first picture of the GOP to perform transform processing on blocks of the first picture to generate a quadruple of transform coefficient blocks for each block of the picture. Each quadruple of transform coefficient blocks generated by the forward transform module is fed to the real-number arithmetic processor 120 and to the frame store module 352. Since no motion estimation is performed on the first picture, the real-number arithmetic processor ignores the quadruples of transform coefficient blocks. However, of each quadruple of transform coefficients, the block of DCT coefficients generated by the transform processor 111 is stored in the frame store 361, the block of DST coefficients generated by the transform processor 112 is stored in the frame store 362, the block of CST coefficients generated by the transform processor 113 is stored in the frame store 363 and the block of SCT coefficients generated by the transform processor 114 is stored in the frame store 364. At the end of coding the first picture of the GOP, blocks of DCT, DST, CST and SCT coefficients for every block of the picture are stored in the frame stores 361, 362, 363 and 364, respectively.

Then, to perform motion estimation for the second picture in the GOP, regions of the frame stores 361–364 are addressed with addresses in a predetermined range corresponding to the location of the search region block 21 in the reference picture. A READ command (not shown) fed to the frame stores causes the frame stores to read out, collectively, a quadruple of transform coefficient blocks. Since the picture from which the quadruples of transform coefficient blocks stored in the frame store is the reference picture, the quadruple of transform coefficient blocks read out is the quadruple of transform coefficient blocks for the search region block 21. The quadruple of transform coefficient blocks for search region block 21 is fed through the distribution bus 356 to the input Q1 of the folding module. In response to other sets of addresses, the frame stores read out, collectively, quadruples of transform coefficient blocks for the search region blocks 22–24. The quadruples of transform coefficient blocks for the search regions 22, 23 and 24 are fed through the distribution bus 356 to the inputs Q2, Q3 and Q4, respectively, of the folding module. The folding module then operates on the quadruples of transform coefficient blocks for the four search region blocks 21–24 to generate the reference quadruple, as described above.

Moreover, as motion estimation is performed on the second picture of the GOP, the forward transform module 110 generates a current quadruple from each current block of the second picture. In addition to being fed to the current quadruple inputs of the real-number arithmetic processor 120, each current quadruple is fed to the frame store module 352, where it is stored, overwriting quadruples of transform coefficient blocks generated from the first picture that are no longer needed for performing motion estimation on the second picture in the GOP.

At the end of performing motion estimation on the second picture, the frame store module 352 is filled with a complete quadruples of transform coefficient blocks generated from the second picture and ready for use as search region blocks for performing motion estimation on the third picture in the GOP.

Even when the coding scheme is one in which the reference picture is not always an I-picture or the previous picture on which motion estimation has been performed, and the search region blocks therefore need to be orthogonally transformed, every search region block of the search region corresponding to the current block does not have to be orthogonally transformed anew for each current block. Only one forward transform module similar to the forward transform module 110 is required to orthogonally transform the search region blocks, since one search region block needs to be transformed anew for each current block. This requires that the quadruples of transform coefficient blocks generated from previously-transformed search region blocks of the reference picture be stored in a suitable buffer memory for use as the quadruples of transform coefficient blocks for the remaining three search region blocks. The amount of memory required is relatively small, namely, four memories each having a size equivalent to (one slice+one block). The four memories each store one of the transform coefficient blocks constituting a quadruple of transform coefficient blocks.

Moreover, in the folding module 304, the quadruple of summed transform coefficient blocks generated by the set 326 of summing modules is generated by the set 327 of summing modules when a motion vector is earlier determined for the block vertically above the current block in the current picture. Thus, the set 323 of sign inversion modules and the set 326 of summing modules can be replaced by four buffer memories each having a capacity equivalent to (one slice+one block). The buffer memories collectively store the quadruples of summed transform coefficient blocks generated by the set 327 of summing modules. Each quadruple of summed transform coefficient blocks collectively stored in the buffer memories is read out once slice later and fed to the set 328 of summing modules in lieu of the quadruple of summed transform coefficient blocks generated by the set 326 of summing modules.

EXAMPLES

The basic motion estimation apparatus and method according to the invention can be adapted to provide motion estimation with different block sizes and different search region sizes. Three specific examples will be described next.

Example 1

Figure 11A:
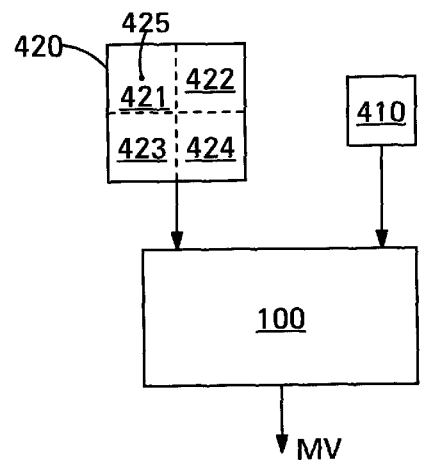
FIG. 11A is a block diagram illustrating the operation of the apparatus and method according to the invention when the search range is equal in size to the current block.

Example 1 is illustrated in FIG. 11A. In this, the sizes of the current block 410 and the blocks into which the search region 420 is partitioned are all 16×16 pixels, and the size of the search range is 16×16 pixels. Consequently, the search region is composed of the four search region blocks 421–424. The search range extends from −8 to +7 pixels horizontally and vertically relative to the point 425 in the reference picture corresponding to the origin of the current block in the current picture. Consequently, the search region blocks 421–424 of 16×16 pixels into which the reference picture is partitioned are offset by 8 pixels horizontally and vertically relative to the blocks of 16×16 pixels, such as the current block 10, into which the current picture is partitioned.

In this example, the motion estimation apparatus and method according to the invention process the current block 410 and the four search region blocks 421–424 as described above to generate the motion vector for the current block.

Example 2

Figure 11B:
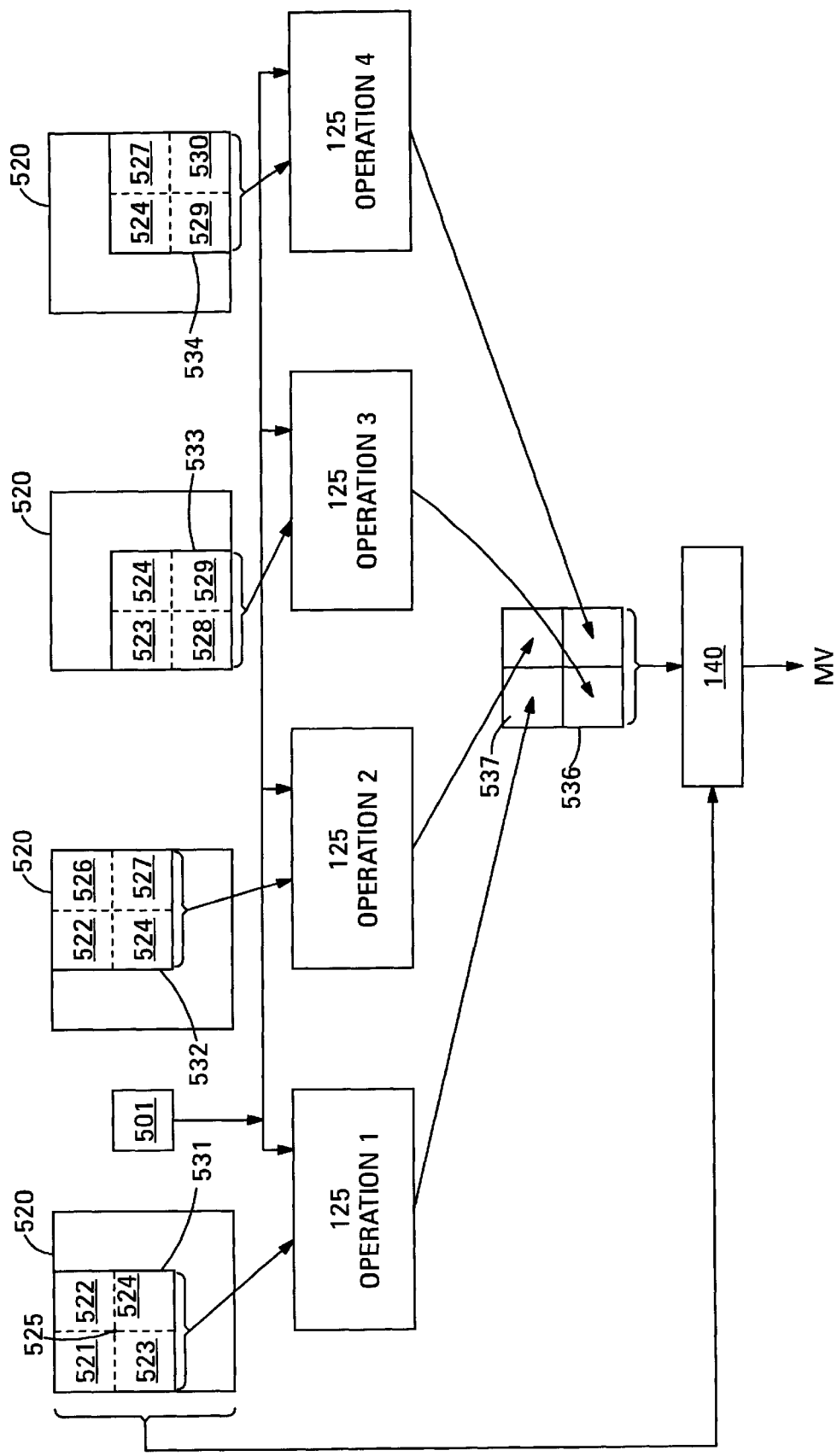
FIG. 11B is a block diagram illustrating the operation of the apparatus and method according to the invention when the search range is twice the size of the current block.

Example 2 is illustrated in FIG. 11B. In this example the sizes of the current block 510 and the blocks into which the search region 520 is partitioned are all 16×16 pixels. The size of the search range is 32×32 pixels. Consequently, the search region is composed of the nine search region blocks 521–424 and 526–530. The search range extends from −16 to +15 pixels horizontally and vertically relative to the point 525 in the reference picture corresponding to the origin of the current block in the current picture. These parameters are typical for MPEG coders. The search region blocks of 16×16 pixels into which the reference picture is partitioned coincide with the blocks of 16×16 pixels into which the current picture is partitioned.

It can be seen from FIG. 11B that the size of the search region 520 is three times, horizontally and vertically, that of the current block 510 and the search region blocks, e.g., 521. To determine the motion vector for the current block 510 relative to the large search region 520, the search region is divided into the overlapping sub regions 531, 532, 533 and 534, each composed of four search region blocks. For example, the sub-region 521 is composed of the four search region blocks 531, 532, 533 and 534.

The current block and, if they have not previously been orthogonally transformed, the nine search region blocks, are orthogonally transformed to generate respective quadruples of transform coefficient blocks. The quadruples of transform coefficient blocks generated from the four search region blocks constituting each sub region are then processed by the folding module 304 (FIG. 10A) to generate a reference quadruple for the respective sub region. For example the quadruples of transform coefficient blocks generated from the search region blocks 521–524 constituting the sub region 531 are processed by the folding module to generate a reference quadruple for the sub region 521, and those generated from the search region blocks 522, 526, 523 and 527 are processed by the folding module to generate a reference quadruple for the sub region 522.

The DCT/DST-based cross-correlation (CSCC) module 125 of the motion estimation apparatus 100, composed of the real-number arithmetic processor 120 and the inverse transform module 130, is then operated four times to process the current quadruple together with the reference quadruple for each of the sub regions. Each operation of the CSCC module generates one quarter of the block 536 of cross-correlations, which is equal in size to the search range. For example, processing the current quadruple together with the reference quadruple for the sub region 521 generates a block of 16×16 cross-correlations that constitutes the quarter 537 of the block of 32×32 cross-correlations.

When the entire block 536 of cross-correlations has been generated, the motion vector determining module 140 is used to generate the motion vector for the current block from the block 536 of cross-correlations and energy values calculated for each potential reference block in the search range.

Although the CSCC module 125 is used four times to determine the motion vector for each current block in this Example, some of the processing may be performed only once provided that the results of the processing are temporarily stored. Specifically, some of the operations performed by the folding module 304 (FIG. 10A) need only be performed once provided that the results of the operations are temporarily stored for use while the current block is processed and for use in processing the next block of the current picture. Moreover, in the real-number arithmetic processor 120, the operations performed by the butterfly modules 188 and 189 on the current quadruple need only be performed once provided that these results are temporarily stored while the current block is processed.

The method according to the invention can be modified to operate with the enlarged search range of this Example. Processes 32, 33 and 34 are run four times, with process 32 processing the current quadruple together with the reference quadruple generated from a different one of the sub regions 531, 532, 533 and 534 in each iteration. In process 34 shown in FIG. 4, process 82 is modified in the second through fourth iterations in that only the coordinates of the block of cross-correlations are initialized to zero and the stored difference value is not initialized to zero. In addition, the coordinates of the potential reference block are initialized to 16, 0 at the start of the second iteration, to 0, 16 at the start of the third iteration and to 16, 16 at the start of the fourth iteration, where 0, 0 is the location of the top, left-hand corner of the reference block 520.

Example 3

In this example, the size of the current block is 16×16 pixels and the size of the search range is 32×32 pixels. The search range extends from −16 to +15 pixels, horizontally and vertically, relative to the point in the reference picture corresponding to the origin of the current block in the current picture.

Example 3 differs from Example 2 only in the size of the transform blocks, i.e., the blocks of the current block and the search region to which the orthogonal transforms are applied. In this example, the size of the transform blocks is 8×8 pixels. MPEG coders use 8×8 DCTs after motion compensation as part of the compression scheme. Therefore, implementing the motion estimation and compensation also in the 8×8 DCT domain has the potential to save intermediate steps of transformations, and has the potential to save computations. However, in the context of the motion estimation apparatus and method according to the invention, this potential saving is not actually achieved. Example 3 has a substantially higher computational complexity than Example 2 because, although 8×8 discrete trigonometric transforms are about four times faster than 16×16 discrete trigonometric transforms, the small size of the transform blocks means that the CSCC module 125 and the folding module 304 have to operate 64 times to generate the motion vector for the current block. As a result, the computational complexity of Example 3 is much higher than that of Example 2.

COMPLEXITY COMPARISON

A complexity comparison was performed between the motion estimation apparatus 100 according to the invention and prior-art motion estimation schemes. The comparison used the number of operations required to determine the motion vector in the context of Example 2 as a comparison criterion. The comparison was based on the assumption that one multiplication is on average the equivalent of three additions. The results are shown in Table 4.

TABLE 4

| Motion Estimation Scheme | Number of Operations |
|---|---|
| Motion estimation apparatus 100 | 122,420 |
| Full search (MSE) | 1,309,696 |
| Full search (MAD) | 523,264 |
| CLT | 166,032 |
| DXT | 371,008 |

Table 4 shows that the motion estimation apparatus 100 has the smallest complexity of all the motion estimation schemes compared. In particular, the motion estimation apparatus 100 gives exactly the same motion vectors as the full search using the MSE (mean square error) criterion, but operates about 10 times faster, and requires one-tenth of the processing resources. The full search using the MAD (mean absolute difference) criterion does not involve performing multiplications but the number of additions and subtractions is very large. This makes the full search-MAD the second most computationally expensive among the algorithms compared. Table 4 shows that the motion estimation apparatus 100 is about 4.3 times faster than full search-MAD. Moreover the large number of absolute comparison operations additionally required by the full search approaches was not included in the number of operations shown for these approaches in Table 4. Consequently, the computational-complexity advantage of the motion estimation apparatus 100 is probably even higher.

In terms of the quality of the motion estimation, the motion estimation apparatus 100 and the full search-MAD give similar results. Both approaches return the result of a full search, differing only by the distance measure employed: the former uses the MSE criterion, whereas the latter uses the MAD criterion. Most of the motion vectors determined by the two approaches are identical. When the two distance criteria generate different motion vectors, neither motion vector is clearly preferable.

The motion estimation apparatus 100 is superior to the two transform domain approaches with which it was compared. The motion estimation apparatus 100 has a lower computational complexity and yields more accurate motion vectors. The number of operations required by the motion estimation apparatus 100 is less than three quarters (74%) of that required by the CLT approach. In addition, the motion estimation apparatus 100 provides an exact search-MSE result, whereas CLT provides an approximation to a filtered cross-correlation.

The other transform domain algorithm, DXT, is not attractive in the context of block motion estimation, as indicated by the results in Table 4. The fundamental disadvantage of requiring the current and reference blocks to be of the same size, together with the edge effects, force this approach to use a large block size. A block size of 32×32 has been proposed. The large block size contributes to a computational complexity that is about three times higher than that of the motion estimation apparatus 100. Moreover, the above-mentioned edge effects considerably reduce the quality of the results generated by the DXT approach.

In the above comparison, with respect to all transform domain approaches, the transform coefficients of the potential reference blocks are assumed to be available in memory, as described above, so that only the current blocks have to be transformed. In this case, four frame stores have to be used, also as described above. When such memory is not available, the forward transforms of the search region have to be have performed again. This increments the computational complexity of the motion estimation apparatus 100 by less than 14%, which is similar to the corresponding complexity increment of the other transform domain approaches. Moreover, the complexity increment is negligible compared to the complexity of the approaches that perform a full search in the spatial domain. Therefore, even when the amount of memory available is limited, the motion estimation apparatus 100 maintains its computational advantage over the other approaches.

The motion estimation apparatus according to the invention can be constructed using dedicated hardware such as adders, multipliers and discrete cosine and sine transform processors. In a preferred embodiment, the motion estimation apparatus according to the invention is embodied in a computer program executed by a microprocessor and suitable auxiliary elements such as random-access and read-only memory (not shown). Alternatively, the computer program may be executed using a digital signal processor (DSP).

In the preferred embodiment of the motion estimation apparatus, a computer or DSP including a motion estimation program implements all of the processes necessary to implement the motion estimation method according to the invention, including performing forward and inverse discrete cosine and sine transforms, performing real-number arithmetic operations, calculating energy and determining maximum values. This disclosure provides sufficient information for a person of ordinary skill in the art to use a high-level (e.g., C or C++) or low-level programming language to write a suitable program implementing the motion estimation method according to the invention. Accordingly, the program listing itself is omitted.

The program implementing the motion estimation method according to the invention could be conveyed to the computer or DSP on which it is to run by embodying the program in a suitable computer-readable medium, such as, but not limited to, a set of floppy disks, a CD-ROM, a DVD-ROM, magnetic tape, or a flash memory or other type of non-volatile memory, or could be transmitted to such computer or DSP by a suitable data link.

Although this disclosure describes illustrative embodiments of the invention in detail, it is to be understood that the invention is not limited to the precise embodiments described, and that various modifications may be practiced within the scope of the invention defined by the appended claims.

MATHEMATICAL ANALYSIS

1. Block Motion Estimation

In a sequence of pictures $\{f^{(t)}(n, m)\}$, where t is an integer time variable and n, m are pixel coordinates, in a video stream, pictures $f^{(t)}(n, m)$ and $f^{(w)}(n, m)$, are the current and reference pictures, respectively. Each picture is partitioned into non-overlapping blocks $\{B_{i,j}\}$ of M×M-pixels, each specifying a data block $\{f^{(t)}(n, m)\}_{(n, m) \in B_{i,j}}$ in the current picture. The search range is defined as a 2D region $\Omega \subset \mathbb{Z}^2$, containing the origin, and D(a, b) denotes a distance measure between two M×M blocks $\{a(n, m)\}$ and $\{b(n,m)\}$.

The task of block motion estimation is to find, for each block (i, j) in the current picture, as a current block, the displacement $(u, v)_{i,j} \in \Omega$ of the block of the reference picture that most closely matches the current block in terms of the distance measure D(·, ·). More specifically, $$(u, v)_{i,j} \text{ arg } \min_{(u,v) \in \Omega} D(y_{i,j}, x_{i,j,u,v}) \quad (1)$$

where:

$$y_{i,j} \triangleq \{f^{(t)}(n, m)\}_{(n,m) \in B_{i,j}} \quad (2)$$

$$x_{i,j,u,v} \triangleq \{f^{(t)}(n+u, m+v)\}_{(n,m) \in B_{i,j}} \quad (3)$$

The vector (u, v)i, j is called the motion vector of the block (i, j).

The most common distance measures are mean absolute difference (MAD) and mean square error (MSE). Mean absolute difference is defined by:

$$D(a, b) \triangleq \frac{1}{M^2} \sum_{(n,m)} |a(n, m) - b(n, m)|$$

Mean square error is defined by:

$$D(a, b) \triangleq \frac{1}{M^2} \sum_{(n,m)} [a(n, m) - b(n, m)]^2$$

The search range $\Omega$ is usually a rectangle of the form $\{-u_{min}, \ldots, u_{max}\} \times \{v_{min}, \ldots, v_{max}\}$. In MPEG coders, typical values of the block size and search range parameters are $u_{min} = v_{min} = u_{max} = v_{max} = M = 16$.

2. Full Search Motion Estimation Schemes

A motion estimation process that exactly calculates a solution to equation (1) above is called a full search process. In contrast, processes that approximate the desired result without actually calculating the distance values for all the vectors in the search range $\Omega$ are called partial search processes.

As noted above, there are two main approaches to performing a full search. In the spatial domain approach, the distance value for each vector in the search range $\Omega$ is calculated and a distance minimizer is chosen according to equation (1). This approach usually uses MAD as the distance function, because calculating the MAD does not require that multiplications be performed. This leads to a faster implementation than using MSE.

The second main approach is the cross-correlation approach, which is also called matched filtering. Cross correlation is based on the following derivation. Applying the MSE distance function to equation (1) and explicitly calculating the squared error gives:

$$(u, v)_{i,j} = \arg\min_{(u,v)\in\Omega} \sum_{(n,m)\in B_{i,j}} ([f^{(t)}(n, m)]^2 - \quad (4)$$

$$2f^{(t)}(n, m)f^{(w)}(n+u, m+v) + [f^{(w)}(n+u, m+v)]^2)$$

$$= \arg\max_{(u,v)\in\Omega} \left\{ 2 \cdot \underbrace{\sum_{(n,m)\in B_{i,j}} f^{(t)}(n, m)f^{(w)}(n+u), (m+v)}_{\triangleq r_{i,j}(u,v)} - \underbrace{\sum_{(n,m)\in B_{i,j}} [f^{(w)}(n+u), (m+v)]^2}_{\triangleq e_{i,j}(u,v)} \right\}$$

The function $r_{i,j}(u, v)$ is the cross-correlation between the current block (i, j) in the current picture and the corresponding potential reference blocks in the reference picture. It can be also regarded as the result of filtering the potential reference blocks by a matched filter whose impulse response is equal to the current block (i, j) with reversed columns and rows.

The function $e_{i,j}(u, v)$ is the energy of the reference block. While the energy can be calculated efficiently by recursion, as disclosed by E. Linzer, P. Tiwari, and M. Zubair in High Performance Algorithms for MPEG Motion Estimation, ICASSP, 1996, the implementing the matched filtering in the spatial domain imposes heavy computational demands. However, as with any other linear filtering, the matched filtering can be implemented efficiently in the Fourier domain. Thus, the cross-correlation approach for performing the full search consists of calculating the cross-correlation and energy functions, and determining the values of u and v that result in the maximum expressed in equation (4).

The motion estimation method and apparatus according to the invention use the cross-correlation approach. However, instead of performing the matched filtering in the Fourier or spatial domains, the matched filtering is performed in the DCT and DST domains. This significantly reduces computational complexity by enabling the processing to be performed without the need to manipulate complex numbers.

3. DCT and DST

(a) One-Dimensional (1-D) Transforms

As reported by S. A. Marcucci, cited above, Wang defined eight types of DCTs and eight types of DSTs, generically called discrete trigonometric transforms (DTTs). Of the family of DTTs, the matched filtering scheme used in the above-described embodiments of the motion estimation method and apparatus according to the invention uses only the DCT and DST of Type IIe (denoted DCT-IIe and DST-IIe, respectively) and the inverse DCT and DST of Type Ie (denoted IDCT-Ie and IDST-Ie, respectively).

The N-point DCT-IIe and DST-IIe of a sequence $\{x(n)\}$, $n = 0, \ldots, N-1$, denoted, respectively, by $\{X_{C_{IIe}}(k)\}$ and $\{X_{S_{IIe}}(k)\}$, are defined by:

$$X_{C_{IIe}}(k) \triangleq C_2(k) \sum_{n=0}^{N-1} x(n)\cos\left(\frac{\pi k\left(n+\frac{1}{2}\right)}{N}\right), \quad (5)$$

$$k = 0, 1, \ldots, N-1,$$

$$X_{S_{IIe}}(k) \triangleq C_2(k) \sum_{n=0}^{N-1} x(n)\sin\left(\frac{\pi k\left(n+\frac{1}{2}\right)}{N}\right), \, k = 1, 2, \ldots, N, \quad (6)$$

The value of $\{C_2(k)\}$, $k=0, \ldots, N$, can be different, depending on the application and purpose. In the motion estimation method and apparatus according to the invention, the value of $C_2(k)$ is set to 1 for $k=0, \ldots, N$ to avoid unnecessary scaling.

The IDCT-Ie and IDST-Ie of order N are defined by:

$$x(n) \triangleq \sum_{k=0}^{N} C_1(k)X_{C_{Ie}}(k)\cos\left(\frac{\pi kn}{N}\right), \, n = 0, 1, \ldots, N \quad (7)$$

$$x(n) \triangleq \sum_{k=1}^{N-1} C_1(k)X_{S_{Ie}}(k)\sin\left(\frac{\pi kn}{N}\right), \, n = 1, 2, \ldots, N-1 \quad (8)$$

Equations (7) and (8) relate the sequence $\{x(n)\}$ to its DCT-Ie $\{X_{C_{Ie}}(k)\}$ and its DST-Ie $\{X_{S_{Ie}}(k)\}$. The input and output of the IDCT-Ie of order N are sequences of $(N+1)$ points, whereas the input and output of the IDST-Ie of order N are sequences of $(N-1)$ points.

Similar to $\{C_2(k)\}$, $\{C_1(k)\}$ can have different values depending on the application. In the motion estimation method and apparatus according to the invention, the value of $\{C_1(k)\}$ is set to $1/(N\sqrt{2})$ for $k=1, \ldots, N-1$, and the values of $C_1(0)$ and $C_1(N)$ are set to $1/(2N\sqrt{2})$. These settings simplify the final expressions used in the motion estimation method and apparatus according to the invention.

(b) Two-Dimensional (2-D) Transforms

Two-dimensional transforms of a two-dimensional block $\{x(n, m)\}$ in the spatial domain are obtained by first applying a 1-D transform to each column of the block and then applying the same or another 1-D transform to each resulting row. This produces separable 2-D transforms, similarly to the 2-D DFT.

Given a pair of 1-D DCT and 1D-DST of a specific type, the separable procedure leads to four 2-D DCT/DST transforms, namely, a 2-D DCT, a 2-D DST, a 2-D mixed DCT/DST, and a 2-D mixed DST/DCT.

The preferred embodiment of the motion estimation method and apparatus uses the four 2-D DCT/DST transforms of Type IIe, and the four 2-D inverse DCT/DST transforms of Type Ie. The separable procedure results in the input and output of all four 2-D DCT/DST-IIe transforms being N×N blocks. However, the situation is different with respect to the inverse transforms of Type Ie: the input and output of the IDCT-Ie, IDST-Ie, IDCT/IDST-Ie and IDST/IDCT-Ie are, respectively, of sizes (N+1)×(N+1), (N−1)×(N−1), (N+1)×(N−1), and (N−1)×(N+1).

For simplicity, all the above forward and inverse 2-D DCT/DST of both types will be redefined in such a way that they all produce (N+1)×(N+1) output blocks. For the forward transforms, this is done simply by assigning zero-valued coefficients to places not defined by the original transform in the [0, N]×[0, N] output domain. Moreover, the input domains for the IDCT/IDST-Ie transforms are also extended to the size (N+1)×(N+1) in the same way. The input domains for the DCT/DST-IIe transforms remain in size N×N. The above-described extensions are illustrated in FIGS. 7B–7E and 9B–9E above. The resulting DCT/DST-IIe transforms are denoted $CC_{II}$, $SS_{II}$, $CS_{II}$ and $SC_{II}$, whereas the IDCT/IDST-Ie transform are denoted $CC_I^{-1}$, $SS_I^{-1}$, $CS_1^{-1}$ and $SC_1^{-1}$.

In this disclosure, the notation for the transform coefficients of Type IIe will be simplified by using the symbols $X_c \triangleq CC_{II}(x)$, $X_s \triangleq SS_{II}(x)$, $X_{cs} \triangleq CS_{II}(x)$ and $X_{sc} \triangleq SC_{II}(x)$, instead of a 2D generalization of the symbols used in the 1D-transform definitions set forth in equations (5) and (6).

(c) Symmetric Extensions

The concept of symmetric extension plays a fundamental role in the theory of DTTs. Marcucci defines four types of symmetries for 1-D-sequences, namely whole-sample symmetry (WS), whole-sample antisymmetry (WA), half-sample symmetry (HS), and half-sample antisymmetry (HA). The terms whole-sample and half-sample indicate whether the symmetry axis is positioned at one of the sequence samples or at the half-way between two samples, respectively. Of the above symmetry types, only the WS and the WA symmetry types are needed to derive the motion estimation method and apparatus according to the invention. These symmetries are those found in the real and imaginary parts, respectively, of the DFT coefficients of a real signal. Since the method and apparatus according to the invention process motion picture signals, an extended definition of these symmetries for application to 2D data blocks is used, as will be described below.

Definition 1: A 2N×2N block $\{\overline{X}(k, l)\}$ is said to be whole-sample symmetric (WS) if:

$$\begin{cases} \overline{X}((2N-k, l))_{2N} = s_1 \overline{X}(k, l), \\ \overline{X}((k, 2N-l))_{2N} = s_2 \overline{X}(k, l), \quad 0 \le k, l \le N \\ \overline{X}((2N-k, 2N-l))_{2N} = s_1 s_2 \overline{X}(k, l) \end{cases}$$

where $s_1, S_2 \epsilon \{1, -1\}$, and $((\cdot))_{2N}$ denotes module 2N. A WS block is called symmetric/symmetric (WSS) if $s_1=s_2=1$, symmetric/antisymmetric (WSA) if $S_1=1$ and $s_2=-1$, antisymmetric/symmetric (WAS) if $s_1=-1$ and $s_2=1$ and antisymmetric/antisymmetric (WAA) if $s_1=s_2=-1$ Definition 2: The WSS, WSA, WAS, and WAA extensions of an (N+1)×(N+1) block X(k, l) are, respectively, the (2N)×(2N) WSS, WSA, WAS, and WAA blocks $\{\overline{X}_p(k, l)\}$, p∈{ss, aa, as, sa}, with $\overline{X}_p(k, l)$=X(k, l), for 0≦k≦N.

Definitions 1 and 2 are used below.

4. DCT/DST-based Matched Filtering

This section outlines the derivation of the DCT/DST-based matched filtering, called cosine-sine matched filtering (CSMF), employed as a element of the motion estimation method and apparatus according to the invention. The inputs to the CSMF process are two blocks of sizes (2N)×(2N) and N×N pixels, respectively. The CSMF process generates an output that is an N×N block containing the cross-correlations between the two input blocks.

First, a procedure will be derived that calculates the cross-correlations between two N×N blocks. This procedure is called the DCT/DST-based cross-correlation procedure (CSCC). Then the desired cosine-sine matched filtering (CSMF) procedure will be derived by describing a pre-processing step that is added to CSCC.

For simplicity, the derivation is divided into two parts.

(a) DCT/DST-Based Cross-Correlation Procedure (CSCC)

A DCT/DST-based cross-correlation procedure could be obtained using a number of different approaches. For instance, 2-D versions of the trigonometric convolution-multiplication properties (CMP's) described by Marcucci could be manipulated. The motion estimation method and apparatus according to the invention employs a direct approach using the convolution-multiplication properties (CMP) of the DFT and the relationship of the latter with the forward DCT/DST of Type IIe, and the inverse DCT/DST of Type Ie.

Two N×N spatial domain blocks are $\{x(n,m)\}_{n,m=0}^{N-1}$ and $\{y(n,m)\}_{n,m=0}^{N-1}$ and their (2N)×(2N) zero-padded extensions are $\{\tilde{x}(n,m)\}_{n,m=0}^{2N-1}$ and $\{\tilde{y}(n,m)\}_{n,m=0}^{2N-1}$.

In other words:

$$\tilde{x}(n, m) = \begin{cases} x(n, m), & 0 \le n, m \le N-1 \\ 0 & \text{otherwise,} \end{cases} \quad (9)$$

and $$\tilde{y}(n, m) = \begin{cases} y(n, m), & 0 \le n, m \le N-1 \\ 0 & \text{otherwise,} \end{cases}$$

The cross-correlation block $\{r(n,m)\}_{n,m=0}^{N-1}$ is defined as:

$$r(n, m) \triangleq \sum_{p=0}^{N-1}\sum_{q=0}^{N-1} y(p, q) \cdot \tilde{x}(p+n, q+m) \quad (10)$$

This can be calculated in the DFT domain using:

$$r(n,m)=IDFT\{\tilde{X}_F(k,l)\cdot\tilde{Y}_F^*(k,l)\}_{n,m=0}^{N-1} \quad (11)$$

where*denotes the complex conjugate, and $\tilde{X}_F$ and $\tilde{Y}_F$ denote the (2N)×(2N) DFTs of $\tilde{x}$ and $\tilde{y}$, respectively.

Equation (11) will next be rewritten in terms of cosine and sine transforms of order N. This is done in three steps in which (i) the forward DFT is related to the DCT/DST-IIe, (ii) the inverse DFT is related to the IDCT/IDST-Ie, and (iii) the obtained relationships are used in equation (11).

The DFTs of the zero-padded blocks are related to the DCT/DST-IIe transforms as follows:

$$\tilde{X}_F(k, l) = \sum_{n=0}^{2N-1}\sum_{m=0}^{2N-1} \tilde{x}(n, m) e^{\frac{-j\pi k n}{2N}} e^{\frac{-j\pi l m}{2N}} \quad (12)$$

$$= e^{\frac{-j\pi k}{2N}} e^{\frac{-j\pi l}{2N}} \sum_{n=0}^{2N-1}\sum_{m=0}^{2N-1} \tilde{x}(n, m) e^{\frac{-j\pi k(2n+1)}{2N}} e^{\frac{-j\pi l(2m+1)}{2N}}$$

$$= e^{\frac{-j\pi k}{2N}} e^{\frac{-j\pi l}{2N}} \left[ \left(\sum_{n=0}^{N-1}\sum_{m=0}^{N-1} x(n, m)\right.\right.$$

$$\cos\frac{\pi k\left(n+\frac{1}{2}\right)}{N}\cos\frac{\pi l\left(m+\frac{1}{2}\right)}{N} -$$

$$\left.\sum_{n=0}^{N-1}\sum_{m=0}^{N-1} x(n, m)\sin\frac{\pi k\left(n+\frac{1}{2}\right)}{N}\sin\frac{\pi l\left(m+\frac{1}{2}\right)}{N}\right) -$$

-continued $$j\left(\sum_{n=0}^{N-1}\sum_{m=0}^{N-1}x(n,m)\cos\frac{\pi k\left(n+\frac{1}{2}\right)}{N}\sin\frac{\pi l\left(m+\frac{1}{2}\right)}{N}+\right.$$

$$\left.\sum_{n=0}^{N-1}\sum_{m=0}^{N-1}x(n,m)\sin\frac{\pi k\left(n+\frac{1}{2}\right)}{N}\cos\frac{\pi l\left(m+\frac{1}{2}\right)}{N}\right)\right]$$

$$= e^{\frac{-j\pi k}{2N}}e^{\frac{-j\pi l}{2N}}\left[\left(\tilde{X}_c(k,l)-\tilde{X}_s(k,l)\right)-j\left(\tilde{X}_{cs}(k,l)+\tilde{X}_{sc}(k,l)\right)\right]$$

where the $(2N)\times(2N)$ blocks $\tilde{X}_c$, $\tilde{X}_s$, $\tilde{X}_{cs}$ and $\tilde{X}_{sc}$ are the WAA, WSS, WAS, and WSA extensions of the N×N DCT/DST-IIe transforms $\tilde{X}_c$, $\tilde{X}_s$, $\tilde{X}_{cs}$ and $\tilde{X}_{cs}$, respectively.

Figure 12:
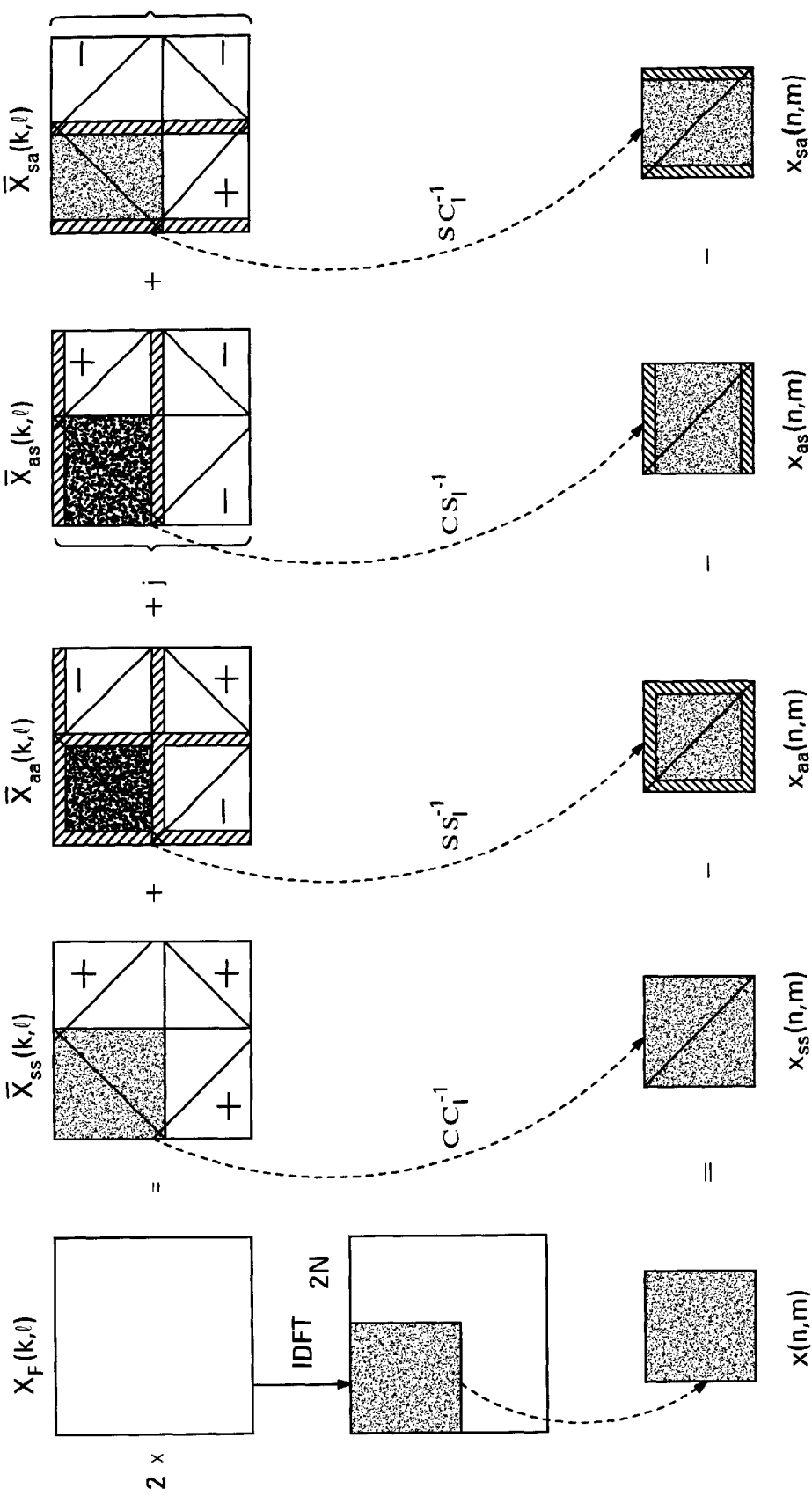
FIG. 12 is a schematic drawing illustrating Proposition 1.

The inverse DFT operation is related to the IDCT/IDST of type Ie, using the following proposition and as illustrated in FIG. 12.

Proposition 1: $\{X_F(k,l)\}$ is a $(2N)\times(2N)$ block, and $\{x(n,m)\}$ is its IDFT. If $\tilde{X}_{ss}$, $\tilde{X}_{sa}$, $\tilde{X}_{as}$, and $\tilde{X}_{aa}$ are WSS, WSA, WAS and WAA blocks, respectively, satisfying:

$$2 \cdot X_F(k,l)=\tilde{X}_{ss}(k,l)+\tilde{X}_{aa}(k,l)+j[\tilde{X}_{as}(k,l)+\tilde{X}_{sa}(k,l)] \quad 0\leq(k,l)\leq 2N-1,$$

then, for $0\leq(n,m)\leq N-1$:

$$x(n,m)=CC_1^{-1}\{X_{ss}\}-CS_1^{-1}\{X_{sa}\}-SC_1^{-1}\{X_{as}\}-SS_1^{-1}\{X_{aa}\}.$$

where, for $p\in\{ss, aa, as, sa\}$, $$\{X_p\}\triangleq\{\tilde{X}_p\}_{k,l=0}^{N}$$

Substituting equation (12) in equation (11) gives, with the indices (n, m) and (k, l) removed for simplicity:

$$r=IDFT\{(\overline{X}_c-\overline{X}_s)(\overline{Y}_c-\overline{Y}_s)+$$
$$(\overline{X}_{cs}+\overline{X}_{sc})(\overline{Y}_{cs}+\overline{Y}_{sc})+$$
$$j[(\overline{X}_c-\overline{X}_s)(\overline{Y}_{cs}+\overline{Y}_{sc})-$$
$$(\overline{X}_{cs}+\overline{X}_{sc})(\overline{Y}_c-\overline{Y}_s)]\}$$
$$n,m=0^{N-1} \qquad (13)$$

To apply Proposition 1, the following blocks, which are WSS, WAA, WSA, and WAS, respectively, are defined:

$$\tilde{Z}_{ss}\triangleq[(\overline{X}_c-\overline{X}_s)(\overline{Y}_c-\overline{Y}_s)+(\overline{X}_{cs}+\overline{X}_{sc})(\overline{Y}_{cs}+\overline{Y}_{sc})]+ \qquad (14)$$
$$[(\overline{X}_c+\overline{X}_s)(\overline{Y}_c+\overline{Y}_s)+(\overline{X}_{cs}-\overline{X}_{sc})(\overline{Y}_{cs}-\overline{Y}_{sc})],$$

$$\tilde{Z}_{aa}\triangleq[(\overline{X}_c-\overline{X}_s)(\overline{Y}_c-\overline{Y}_s)+(\overline{X}_{cs}+\overline{X}_{sc})(\overline{Y}_{cs}+\overline{Y}_{sc})]-$$
$$[(\overline{X}_c+\overline{X}_s)(\overline{Y}_c+\overline{Y}_s)+(\overline{X}_{cs}-\overline{X}_{sc})(\overline{Y}_{cs}-\overline{Y}_{sc})],$$

$$\tilde{Z}_{sa}\triangleq[(\overline{X}_c-\overline{X}_s)(\overline{Y}_c+\overline{Y}_s)-(\overline{X}_{cs}+\overline{X}_{sc})(\overline{Y}_{cs}-\overline{Y}_{sc})]+$$
$$[(\overline{X}_c+\overline{X}_s)(\overline{Y}_c-\overline{Y}_s)-(\overline{X}_{cs}-\overline{X}_{sc})(\overline{Y}_{cs}+\overline{Y}_{sc})],$$

$$\tilde{Z}_{as}\triangleq[(\overline{X}_c-\overline{X}_s)(\overline{Y}_c+\overline{Y}_s)-(\overline{X}_{cs}+\overline{X}_{sc})(\overline{Y}_{cs}-\overline{Y}_{sc})]-$$
$$[(\overline{X}_c+\overline{X}_s)(\overline{Y}_c-\overline{Y}_s)-(\overline{X}_{cs}-\overline{X}_{sc})(\overline{Y}_{cs}+\overline{Y}_{sc})],$$

It can be verified that:

$$r=\tfrac{1}{2}IDFT\{(\tilde{Z}_{ss}+\tilde{Z}_{aa})+j(\tilde{Z}_{sa}+\tilde{Z}_{as})\}_{n,m=0}^{N-1} \qquad (15)$$

Applying Proposition 1 to equation (15) gives:

$$r=CSCC\{X_c,X_s,X_{cs},X_{sc};\ Y_c,Y_s,Y_{cs},Y_{sc}\}$$

$$\triangleq CC_1^{-1}\{[(X_c-X_s)(Y_c-Y_s)+(X_{cs}+X_{sc})(Y_{cs}+Y_{sc})]+[(X_c+X_s)(Y_c+Y_s)+(X_{cs}-X_{sc})(Y_{cs}-Y_{sc})]\}_{n,m=0}^{N-1}$$

$$-SS_1^{-1}\{[(X_c-X_s)(Y_c-Y_s)+(X_{cs}+X_{sc})(Y_{cs}+Y_{sc})]-[(X_c+X_s)(Y_c+Y_s)+(X_{cs}-X_{sc})(Y_{cs}-Y_{sc})]\}_{n,m=0}^{N-1}$$

$$-CS_1^{-1}\{[(X_c-X_s)(Y_{cs}-Y_{sc})-(X_{cs}+X_{sc})(Y_c-Y_s)]+[(X_c+X_s)(Y_{cs}-Y_{sc})-(X_{cs}-X_{sc})(Y_c+Y_s)]\}_{n,m=0}^{N-1}$$

$$-SC_1^{-1}\{[(X_c-X_s)(Y_c+Y_s)-(X_{cs}+X_{sc})(Y_c-Y_s)]-[(X_c+X_s)(Y_c-Y_s)-(X_{cs}-X_{sc})(Y_c+Y_s)]\}_{n,m=0}^{N-1} \qquad (16)$$

Equation (16) defines the DCT/DST-based cross-correlation procedure, CSCC, which is illustrated in FIGS. 6 and 8. The function CSCC{·} is the core of the motion estimation apparatus and method according to the invention, and forms the basis of the matched filtering to be described next. The maximum block size used in the cross-correlation procedure is (N+1)×(N+1). Moreover, no DFT or IDFT is actually calculated, and the processing is performed using real-number arithmetic, with no manipulation of complex numbers. The (2N)×(2N) blocks, symmetric/antisymmetric extensions, and DFTs used in the derivation are intermediate results that are implicit in the processing, but do not have to be generated in the actual implementation.

(b) DCT/DST-based Matched Filter Procedure (CSMF)

The N×N block $\{r(n,m)\}$ of cross-correlations between a N×N block $\{y(n,m)\}$ and a $(2N)\times(2N)$ block $\{x(n,m)\}$ is calculated in the spatial domain as follows:

$$r(n,m)\triangleq\sum_{p=0}^{N-1}\sum_{q=0}^{N-1}y(p,q)\cdot x(p+n,q+m),\quad 0\leq n,m\leq N-1 \qquad (17)$$

As before, this can be performed in the DFT domain as follows:

$$r(n,m)=IDFT\{X_F(k,l)\cdot\tilde{Y}_F^*(k,l)\}_{n,m=0}^{N-1} \qquad (18)$$

where $X_F$ is the $(2N)\times(2N)$ DFT transform of x. As before, $\tilde{Y}_F$ is the DFT of the zero-padded block y, which can be calculated using N×N DCT/DST-IIe transforms according to equation (12).

To represent $X_F$ using DCT/DST-IIe transforms, for $0<n, m<2N-1$:

$$x(n,m)=\tilde{x}^{(1)}(n,m)+\tilde{x}^{(2)}((n+N,m))_{2N}+\tilde{x}^{(3)}((n,m+N))_{2N}+\tilde{x}^{(4)}((n+N,m+N))_{2N} \qquad (19)$$

where:

$$\tilde{x}^{(1)}(n,m)\triangleq\begin{cases}x(n,m),&0\leq n,m\leq N-1,\\0,&\text{otherwise,}\end{cases} \qquad (20)$$

$$\tilde{x}^{(2)}(n,m)\triangleq\begin{cases}x(n+N,m),&0\leq n,m\leq N-1,\\0,&\text{otherwise,}\end{cases}$$

$$\tilde{x}^{(3)}(n,m)\triangleq\begin{cases}x(n,m+M),&0\leq n,m\leq N-1,\\0,&\text{otherwise,}\end{cases}$$

$$\tilde{x}^{(4)}(n,m)\triangleq\begin{cases}x(n+N,m+N),&0\leq n,m\leq N-1,\\0,&\text{otherwise,}\end{cases}$$

Therefore, in the DFT domain, the following holds:

$$X_F(k,l)=\tilde{X}_F^{(1)}(k,l)+(-1)^k\tilde{X}_F^{(2)}(k,l)+(-1)^l\tilde{X}_F^{(3)}(k,l)+(-1)^{k+l}\tilde{X}_F^{(4)}(k,l) \qquad (21)$$

Substituting equation (12) in equation (21) gives:

$$X_F(k, l) = e^{\frac{j\pi k}{2N}} e^{\frac{j\pi l}{2N}} [(\overline{X}_c^a(k, l) - \overline{X}_s^a(k, l)) - j(\overline{X}_{cs}^a(k, l) + \overline{X}_{sc}^a(k, l))] \quad (22)$$

where $\{\overline{X}_p^a\}$, $p \in \{c, s, cs, sc\}$ are, respectively, the WAA, WSS, WAS, WSA extensions of the blocks:

$$X_p^a(k,l) \triangleq \tilde{X}_p^{(1)}(k,l) + (-1)^k \tilde{X}_p^{(2)}(k,l) + (-1)^l \tilde{X}_p^{(3)}(k,l) + (-1)^{k+l} \tilde{X}_p^{(4)}(k,l) \quad (23)$$

Equations (22) and (18), and the CSCC derived above finally lead to the following result:

$$r = CSMF\{x^{(1)}, x^{(2)}, x^{(3)}, x^{(4)}\}, y\} \triangleq CSCC\{\{X_c^a, X_s^a, X_{cs}^a, X_{sc}^a; Y_c, Y_s, Y_{cs}, Y_{sc}\} \quad (24)$$

where the routine CSMF{·} characterizes the DCT/DST-based matched filtering process. The process consists of (i) folding the (2N)×(2N) search region block in the transform domains, producing one single reference is quadruple of N×N transform coefficient blocks $X_p^a$, $p \in \{c, s, cs, sc\}$, and (ii) inputting the above reference quadruple, together with the current quadruple of transform coefficient generated from the current blocky, into the cosine-sine cross-correlation function CSCC{·}

As mentioned above, the specific way in which the matched filtering routine is applied in the motion estimation method and apparatus according to the invention depends on such motion estimation parameters as the size M×M of the current block, the size of the search range $\Omega = \{-u_{min}, \ldots, u_{max}\} \times \{-v_{min}, \ldots, u_{max}\}$, and the size N×N of the transform blocks, i.e., the blocks subject to orthogonal transformation. The mathematical derivation of the three specific examples described above will now be described.

EXAMPLE 1

M=N=16, $\Omega = \{-8, \ldots, 7\} \times \{-8, \ldots, 7\}$ (see FIG. 11A)

In this example, the size of the search range $\Omega$ is 16×16 pixels, i.e., the same as that of the current block (M×M) and of the transform blocks (N×N). In this example, each block $\{r_{i,j}(n, m)\}$ of cross-correlations can be calculated using:

$$r_{i,j} = CSMF\{f_{i,j}^{(w)}, f_{i+1,j}^{(w)}, f_{i,j+1}^{(w)}, f_{i+1,j+1}^{(w)}, f_{i,j}^{(t)}\} \quad (25)$$

where:

$$f_{i,j}^{(w)} \triangleq \{f^w(n-8, m-8)\}_{(n,m) \in B_{i,j}}$$

$$f_{i,j}^{(w)} \triangleq \{f^t(n,m)\}_{(n,m) \in B_{i,j}} \quad (26)$$

The above equations indicate that, in this example, the partitioning of the reference picture into blocks of M×M pixels is shifted by 8 pixels horizontally and vertically relative to the partitioning of the current picture.

EXAMPLE 2

M=N=16, $\Omega = \{-16, \ldots, 15\} \times \{-16, \ldots, 15\}$ (See FIG. 11B)

In Example 2, the size of the search range $\Omega$ is 32×32 pixels, whereas the block size M×M is equal to 16×16. These parameters are typical for MPEG coders. The size of the search range is four times that of the current block and the transform blocks. Therefore, the basic matched filtering scheme CSMF has to be used four times, once to generate each quarter of the cross-correlation block $r_{i,j}$, which is of the same size as $\Omega$. The optimum arrangement for this example is the following:

$$r_{i,j}(u, v) = \quad (27)$$

$$\begin{cases} CSMF(f_{i-1,j-1}^w, f_{i,j-1}^w, f_{i-1,j}^w, f_{i,j}^w, f_{i,j}^t), & \text{if } u < 0 \text{ and } v < 0, \\ CSMF(f_{i,j-1}^w, f_{i+1,j-1}^w, f_{i,j}^w, f_{i+1,j}^w, f_{i,j}^t), & \text{if } u \geq 0 \text{ and } v < 0, \\ CSMF(f_{i-1,j}^w, f_{i,j}^w, f_{i-1,j+1}^w, f_{i,j+1}^w, f_{i,j}^t), & \text{if } u < 0 \text{ and } v \geq 0, \\ CSMF(f_{i,j}^w, f_{i+1,j}^w, f_{i,j+1}^w, f_{i+1,j+1}^w, f_{i,j}^t), & \text{if } u \geq 0 \text{ and } v \geq 0, \end{cases}$$

where:

$$f_{i,j}^{(w)} \triangleq \{f^w(n,m)\}_{(n,m) \in B_{i,j}}$$

$$f_{i,j}^{(w)} \triangleq \{f^t(n,m)\}_{(n,m) \in B_{i,j}} \quad (28)$$

In this example, the partitioning of the reference picture into blocks of M×M pixels coincides with the partitioning of the current picture.

EXAMPLE 3

M=16, N=8, $\Omega = \{-16, \ldots, 15\} \times \{-16, \ldots, 15\}$

This example differs from Example 2 only in the size of the transform blocks. This example has relevance because MPEG coders use 8×8 DCTs after motion compensation as part of the compression scheme. Therefore, implementing the motion estimation and motion compensation also in the 8×8 DCT domain could potentially save intermediary steps of transformations, and therefore has the potential to save computations. However, in the context of the implementation in the apparatus and method according to the invention, this saving is not actually achieved. Example 3 has a substantially higher computational complexity than Example 2 above because, although 8×8 transforms are about four times faster than 16×16 transforms, the small size of the transform blocks requires that the CSMF{·} procedure be performed 64 times to produce the motion vector for the current block. Consequently, the computational complexity of Example 3 is much higher than that of Example 2.

We claim:

1. A motion estimation method for determining a motion vector between a current block and a reference block of a reference frame, the reference block being a block located in a search region of the reference picture that most closely matches the current block, the search region being divided into search region blocks, the method comprising:

orthogonally transforming the current block using DCT/DST transforms of a first type without prior zero padding of the current block to generate a current quadruple of transform coefficient blocks;

processing the current quadruple together with a reference quadruple of transform coefficient blocks generated from four of the search region blocks to generate a quadruple of processed transform coefficient blocks;

inversely transforming the quadruple of processed transform coefficient blocks using inverse DCT/DST transforms of a second type to generate a block of exact cross-correlations between the current block and the search region; and determining the motion vector from the block of exact cross-correlations.

2. The method of claim 1, in which, in inversely transforming the quadruple of processed transform coefficient blocks, the inverse DCT/DST transforms of the second type are of a type different from the DCT/DST transforms of the first type in orthogonally transforming the current block.

3. The method of claim 2, in which:

in orthogonally transforming the current block, the DCT/DST transforms of the first type are Type IIe DCT/DST transforms; and in inversely transforming the quadruple of processed transform coefficient blocks, the inverse DCT/DST transforms of the second type are Type Ie DCT/DST transforms.

4. The method of claim 1, in which:
in orthogonally transforming the current block, the current block is composed of N×N pixel values;
orthogonally transforming the current block includes:
transforming the current block to generate a quadruple of blocks of N×N transform coefficients, and
selectively assigning rows and columns of zero-value coefficients to the blocks of N×N transform coefficients to generate respective blocks of (N+1)×(N+1) transform coefficients as the current quadruple; and
inversely transforming the processed blocks includes:
inversely transforming the quadruple of processed transform coefficient blocks of (N+1)×(N+1) transform coefficients using the inverse DCT/DST transforms of the second type to generate inversely-transformed blocks of (N+1)×(N+1) elements, and
summing the inversely-transformed blocks to generate the block of exact cross-correlations.

5. The method of claim 1, in which determining the motion vector includes:
for each one of the exact cross correlations in the block of exact cross correlations:
determining an energy,
doubling the one of the exact cross correlations to calculate a doubled one of the exact cross-correlations, and
subtracting the energy from the doubled one of the exact cross correlations to calculate a difference; and
adopting as the motion vector the coordinates in the block of exact cross correlations of the one of the exact cross correlations for which the, difference is a maximum.

6. The method of claim 1, in which, in processing the current quadruple together with the reference quadruple, the reference quadruple is generated from the four of the search region blocks by a processes including:
orthogonally transforming each one of the four of the search region blocks using DCT/DST transforms of the first type without prior zero padding of the one of the four search region blocks to generate a respective quadruple of search region transform coefficient blocks; and
performing a folding operation on the quadruples of search region transform coefficient blocks to generate the reference quadruple.

7. The method of claim 1, in which, in processing the current quadruple together with the reference quadruple, the reference quadruple is generated from the four of the search region block by a processes including:
storing the quadruple of transform coefficients generated by orthogonally transforming each block of the reference frame;
reading out the quadruple of stored transform coefficient blocks corresponding to each of the four of the search region blocks; and
performing a folding operation on the read-out quadruples of stored transform coefficient blocks corresponding to each of the search region blocks to generate the reference quadruple.

8. The method of claim 1, in which processing the current quadruple together with the reference quadruple includes:
performing first butterfly operations among blocks of the current quadruple and among blocks of the reference quadruple to generate blocks of butterfly summed transform coefficients and blocks of butterfly subtracted transform coefficients;
multiplying pairs of the blocks of butterfly summed transform coefficients from the current quadruple and the reference quadruple and multiplying pairs of the blocks of butterfly subtracted transform coefficients from the current quadruple and the reference quadruple to generate eight blocks of multiplied transform coefficients;
one of (a) summing and (b) subtracting pairs of the eight blocks of multiplied transform coefficients to generate two blocks of summed transform coefficients and two blocks of subtracted transform coefficients; and
performing second butterfly operations between the two blocks of summed transform coefficients to generate a block of DCT coefficients and a block of DST coefficients and between the two blocks of subtracted transform coefficients to generate a block of SCT coefficients and a block of CST coefficients, the blocks of DCT, DST, CST and SCT coefficients constituting the quadruple of processed transform coefficients.

9. Motion estimation apparatus for determining a motion vector between a current block and a reference block of a reference frame, the reference block being a block located in a search region of the reference picture that most closely matches the current block, the search region being divided into search region blocks, the apparatus comprising:
an orthogonal transform module connected to receive the current block and operating to generate a current quadruple of transform coefficient blocks by orthogonally transforming the current block using DCT/DST transforms of a first type without prior zero padding of the current block;
a processing module connected to receive the current quadruple from the orthogonal transform module, and additionally to receive a reference quadruple of transform coefficient blocks generated from four of the search region blocks, the processing module operating to generate a quadruple of processed transform coefficient blocks from the current quadruple and the reference quadruple;
an inverse transform module connected to receive the quadruple of processed transform coefficient blocks from the processing module, and operating to generate a block of exact cross-correlations between the current block and the search region by inversely transforming the quadruple of processed transform coefficient blocks using inverse DCT/DST transforms of a second type; and
a motion vector determining module connected to receive the block of exact cross-correlations and operating to determine the motion vector therefrom.

10. The apparatus of claim 9, in which the inverse DCT/DST transforms of the second type are of a type different from the DCT/DST transforms of the first type.

11. The apparatus of claim 10, in which:
the DCT/DST transforms of the first type are Type IIe DCT/DST transforms; and
the inverse DCT/DST transforms of the second type are Type Ie DCT/DST transforms.

12. The apparatus of claim 9, in which:
the current block is composed of N×N pixel values;
the orthogonal transform module includes:
a transform module connected to receive the current block and operating to generate a quadruple of blocks of N×N transform coefficients by orthogonally transforming the current block using a discrete cosine transform, a discrete sine transform, a mixed cosine-sine transform and a mixed sine-cosine transform, and a zero-padding module that operates to selectively assign rows and columns of zero-value coefficients to the blocks of N×N transform coefficients to generate respective blocks of (N+1)×(N+1) transform coefficients as the current quadruple; and the inverse transform module includes:

a transform module connected to receive the quadruple of processed transform coefficient blocks of (N+1)×(N+1) transform coefficients and operating to using the inverse DCT/DST transforms of the second type to generate inversely-transformed blocks of (N+1)×(N+1) elements by inversely orthogonally transforming blocks constituting the quadruple using an inverse discrete cosine transform, an inverse discrete sine transform, an inverse mixed cosine-sine transform and an inverse mixed sine-cosine transform, and a summing module connected to receive the inversely-transformed blocks and operating to generate the block of exact cross-correlations from the inversely-transformed blocks.

13. The apparatus of claim 9, in which the motion vector determining module includes:

an energy determining module that operates to determine an energy for each one of the exact cross correlations in the block of exact cross correlations;

a doubling module that operates to double the one of the exact cross-correlations to calculate a doubled one of the exact cross-correlations, and a subtracting module that operates to subtract the energy of the one of the exact cross-correlations from the doubled one of the exact cross correlations to calculate a difference for the one of the exact cross-correlations; and a selecting module that operates to adopt, as the motion vector, the coordinates in the block of exact cross correlations of the one of the exact cross correlations for which the difference is a maximum.

14. The apparatus of claim 9, in which:

the orthogonally transform module additionally operates to orthogonally transform each one of the four of the search region blocks using the DCT/DST transforms of the first type without prior zero padding of the one of the four search region blocks generate a respective quadruple of search region transform coefficient blocks; and the apparatus additionally comprises a folding module connected to receive the quadruples of search region transform coefficient blocks from the orthogonal transform module and operating to generate the reference quadruple by applying a folding operation to the quadruples of search region blocks.

15. The apparatus of claim 9, additionally comprising a memory configured to store the quadruple of transform coefficients generated from each block of the reference frame by the orthogonal transform module;

a reading module configured to cause the memory to read out the quadruple of stored transform coefficient blocks corresponding to each of the four of the search region blocks; and a folding module connected to receive the quadruples of transform coefficient blocks read out from the memory for each of the search region blocks and operating to generate the reference quadruple by applying a folding operation to the quadruples of search region blocks.

16. The apparatus of claim 1, in which the processing module includes:

a first butterfly operation module connected to receive the current quadruple and the reference quadruple, and operating to perform butterfly operations among blocks of the current quadruple and among blocks of the reference quadruple to generate blocks of butterfly summed transform coefficients and blocks of butterfly subtracted transform coefficients;

a multiplying module connected to receive the blocks of butterfly summed transform coefficients and blocks of butterfly subtracted transform coefficients from the first butterfly module and operating to multiply pairs of the blocks of butterfly summed transform coefficients from the current quadruple and the reference quadruple and to multiply pairs of the blocks of butterfly subtracted transform coefficients from the current quadruple and the reference quadruple to generate eight blocks of multiplied transform coefficients;

a summing module connected to receive the eight blocks of multiplied transform coefficients from the multiplying module and operating to one of (a) sum and (b) subtract pairs of the eight blocks of multiplied transform coefficients to generate two blocks of summed transform coefficients and two blocks of subtracted transform coefficients; and a second butterfly module connected to receive the two blocks of summed transform coefficients and the two blocks of subtracted transform coefficients and operating to perform butterfly operations between the two blocks of summed transform coefficients to generate a block of DCT coefficients and a block of DST coefficients and between the two blocks of subtracted transform coefficients to generate a block of SCT coefficients and a block of CST coefficients, the blocks of DCT, DST, CST and SCT coefficients constituting the quadruple of processed transform coefficients.

17. A computer-readable medium in which is fixed a computer program that instructs a computer to perform a motion estimation method that determines a motion vector between a current block and a reference block of a reference frame, the reference block being a block located in a search region of the reference picture that most closely matches the current block, the search region being divided into search region blocks, the motion estimation method comprising:

orthogonally transforming the current block using DCT/DST transforms of a first type without prior zero padding of the current block to generate a current quadruple of transform coefficient blocks;

processing the current quadruple together with a reference quadruple of transform coefficient blocks generated from four of the search region blocks to generate a quadruple of processed transform coefficient blocks;

inversely transforming the quadruple of processed transform coefficient blocks using inverse DCT/DST transforms of a second type to generate a block of exact cross-correlations between the current block and the search region; and determining the motion vector from the block of exact cross-correlations.

18. The computer-readable medium of claim 17, in which:

in orthogonally transforming the current block, the DCT/DST transforms of the first type are Type IIe DCT/DST transforms; and in inversely transforming the quadruple of processed transform coefficient blocks, the inverse DCT/DST transforms of the second type are Type Ie DCT/DST transforms.

19. The computer-readable medium of claim 17, in which:

in orthogonally transforming the current block, the current block is composed of N×N pixel values;

orthogonally transforming the current block includes:
  transforming the current block to generate a quadruple of blocks of N×N transform coefficients, and
  selectively assigning rows and columns of zero-value coefficients to the blocks of N×N transform coefficients to generate respective blocks of (N+1)×(N+1) transform coefficients as the current quadruple; and inversely transforming the processed blocks includes:
  inversely transforming the quadruple of processed transform coefficient blocks of (N+1)×(N+1) transform coefficients using the inverse DCT/DST transforms of the second type to generate inversely-transformed blocks of (N+1)×(N+1) elements, and
  summing the inversely-transformed blocks to generate the block of exact cross-correlations.

20. The computer-readable medium of claim 17, in which processing the current quadruple together with the reference quadruple includes:

performing first butterfly operations among blocks of the current quadruple and among blocks of the reference quadruple to generate blocks of butterfly summed transform coefficients and blocks of butterfly subtracted transform coefficients;

multiplying pairs of the blocks of butterfly summed transform coefficients from the current quadruple and the reference quadruple and multiplying pairs of the blocks of butterfly subtracted transform coefficients from the current quadruple and the reference quadruple to generate eight blocks of multiplied transform coefficients;

one of (a) summing and (b) subtracting pairs of the eight blocks of multiplied transform coefficients to generate two blocks of summed transform coefficients and two blocks of subtracted transform coefficients; and performing second butterfly operations between the two blocks of summed transform coefficients to generate a block of DCT coefficients and a block of DST coefficients and between the two blocks of subtracted transform coefficients to generate a block of SCT coefficients and a block of CST coefficients, the blocks of DCT, DST, CST and SCT coefficients constituting the quadruple of processed transform coefficients.

* * * * *